(12) United States Patent
Jensen et al.

(10) Patent No.: US 10,091,972 B1
(45) Date of Patent: Oct. 9, 2018

(54) SMART BOWL SYSTEM, APPARATUS AND METHOD

(71) Applicant: OBE, Inc., Mill Valley, CA (US)

(72) Inventors: Hilary Jane Jensen, Mill Valley, CA (US); Ernest Edward Ward, Jr., Ocean Isle, NC (US); Jean Renying Kao, San Francisco, CA (US)

(73) Assignee: OBE INC., Mill Valley, CA (US)

( * ) Notice: Subject to any disclaimer, the term of this patent is extended or adjusted under 35 U.S.C. 154(b) by 332 days.

(21) Appl. No.: 15/150,277

(22) Filed: May 9, 2016

Related U.S. Application Data

(60) Provisional application No. 62/159,171, filed on May 8, 2015.

(51) Int. Cl.
*A01K 5/02* (2006.01)
*A01K 7/02* (2006.01)

(52) U.S. Cl.
CPC .......... *A01K 5/0283* (2013.01); *A01K 5/0291* (2013.01); *A01K 7/02* (2013.01)

(58) Field of Classification Search
CPC ....... A01K 5/0283; A01K 7/02; A01K 5/0291
See application file for complete search history.

(56) References Cited

U.S. PATENT DOCUMENTS 6,135,056 A * 10/2000 Kuo ...................... A01K 5/0291
119/51.11
8,100,084 B1 * 1/2012 Abramson ........... A01K 5/0283
119/51.02
2010/0263596 A1 * 10/2010 Schumann ........... A01K 5/0114
119/51.02
2012/0227668 A1 * 9/2012 Aycock ................ A01K 5/0114
119/51.02
2014/0257753 A1 * 9/2014 Wang ....................... A23K 1/00
702/188
2015/0342143 A1 * 12/2015 Stewart ................ A01K 5/0275
119/51.02
2016/0012748 A1 * 1/2016 Donavon .................. G09B 5/02
434/225
2017/0099804 A1 * 4/2017 Chang .................. A01K 5/0233
2018/0125032 A1 * 5/2018 Richards .................. A01K 7/06

* cited by examiner

*Primary Examiner* — Erin F Heard
(74) *Attorney, Agent, or Firm* — Staniford Tomita LLP

(57) ABSTRACT

A smart bowl system includes one more food and water smart bowls that each has a processor, memory, and a bowl weight sensor. The smart bowls communicate with a cloud server and one or more caretaker computing devices. The caretakers can input physical information for the pet including weight. The smart bowl system can determine the healthy weight range for the pet and determine a recommended feeding schedule. The smart bowl system can remind the caretakers to feed the pet, monitor the quantity of food and water that are placed in the smart bowls and the consumption of the food and water by the pet and transmit reports to the caretaker's computing device(s). The smart bowl system can maintain the recommended feeding schedule to keep the pet within the healthy weight range or adjust the feeding schedule to bring the pet's weight within the healthy weight range.

19 Claims, 15 Drawing Sheets

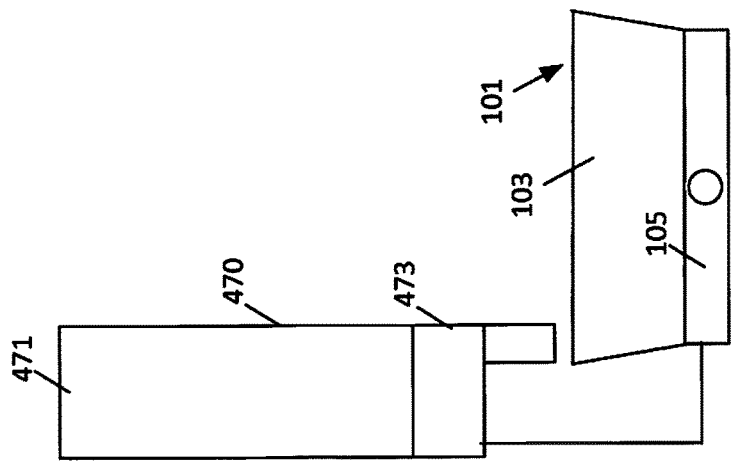
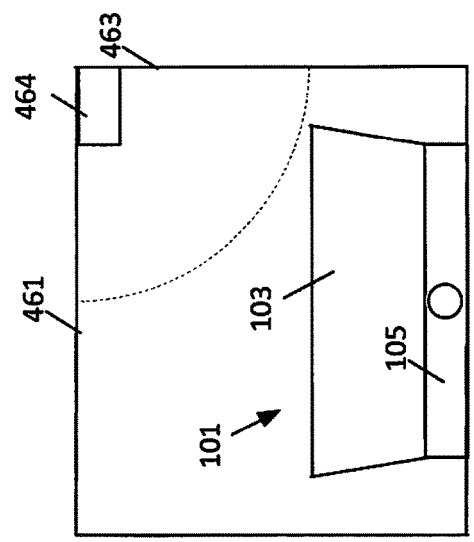
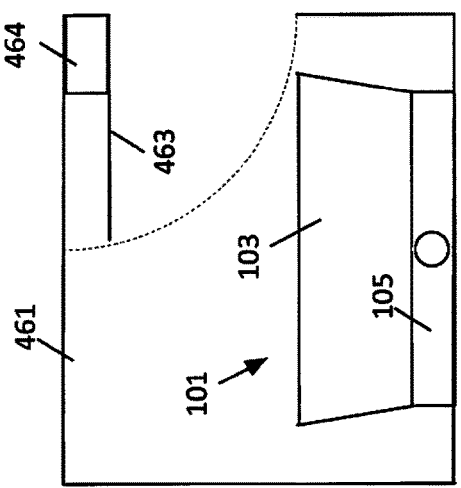

SMART BOWL SYSTEM, APPARATUS AND METHOD

CROSS REFERENCE TO RELATED APPLICATIONS

This application claims priority to U.S. Provisional Patent Application No. 62/159,171, "Smart Pet Feeding And Monitoring System" filed May 8, 2015, which is hereby incorporated by reference in its entirety.

FIELD OF THE INVENTION

The present invention relates to a smart pet bowl system, apparatus and method that monitors and records information about the quantity of food and water that should be placed in pets' food and water bowls and the consumption of the pet food and water.

BACKGROUND

An increasing number of people consider their pet (e.g., dog, cat) a member of their family and want their pets to live the longest, healthiest lives possible. In the US, there are more dogs than there are kids today. What pets eat and drink has a major influence on their health and wellbeing and pet parents spend billions of dollars a year on pet food because of this. More than half of dogs and cats are overweight or obese which shortens life spans and causes expensive, painful health problems like diabetes and arthritis. The majority of pet owners enjoy feeding their pet as part of a daily ritual and manifestation of love they feel for their animal. Typically feeding the pet is part of an established and very regular schedule to help keep the pet calm and happy. But the majority of pet owners do not know the right amount of food to feed their pet and find it difficult to decipher the instructions on the pet food packages, and practically speaking adhering to the required measurement. Keeping a regular pet meal schedule can be challenging and is often the responsibility of multiple family members or caretakers. What is needed is a system that makes it easy to manage, monitor and track the trends of the food and water provided to the pet, recording and then analyzing the times and quantities and trends of the pet's food and water consumption. What is needed is a smart bowl with a smart phone app that can help solve the obesity epidemic for cats and dogs, and make it easy for their owners to feed their dog or cat the right amount.

SUMMARY OF THE INVENTION

The present invention is directed towards a system and apparatus for measuring, managing and guiding the optimal amounts of the food and water consumption of one or more pets living at a home. Food and water doesn't only play a role in happiness. A change in eating and drinking habits can be an indicator that there is something wrong with the pet. For example, a dog's nutrition, water and feeding needs vary based on age, breed and activity level. What is in the food and water affects the health and wellbeing of the pet and the dog's longevity. More than 50% of dogs and cats are currently overweight or obese. It can be difficult for most owners to understand the pet food labels when purchasing pet food and personalize the food servings for their pets. For example, how many calories their specific pets may need on a daily basis versus the pet food label recommendations, how good the pet food is for their pets and what value for the money the purchased pet food is providing. Moreover, a pet's nutrition, dietary and hydration requirements change over time based on factors including: age, activity level, breed, sex, surgery history and/or need to lose weight. Being able to dynamically address these changes will help more pets stay happy, at a healthy weight, and properly nourished.

Devices and commercial products for pet-care include automatic pet feeders, remote pet feeders, ratings on dog foods, cookbooks, and websites/blogs with advice. Veterinarians are often a source for more objective information on nutrition, but because they make money off of the products they sell, some consumers discount their advice. Pet activity monitors have been introduced to help monitor the activity of one's pet and to ensure that one is getting value for your money with a dog-walker for example. GPS trackers may help track and/or locate pets. These are often bulky, require a collar, and require a monthly fee for the service. Smart-collars have also entered the market. They give real-time status of the dog, if the dog is wearing the collar.

The invention enables weighing, managing and monitoring of the amount of food and water a dog consumes. There is a need for a device that measures portions and food no matter the type of food including: wet, dry, raw or freeze dried etc. There is also a need for a device that tracks whether and when the pet has been fed or given water and gives reminders to feed the pet or change or add water to his bowl. Although the term, "smart bowl" is used throughout this patent application, the described apparatus, systems and methods can be used with any other types of food and water holders including: plates, food and water dispensers, feeders, etc.

The inventive system also monitors a pet's nutrition intake and/or monitors other attributes about the pet even if the pet is not wearing a collar such as a smart collar or other tracking device. The inventive system can monitor a quantity of purchased food and the pet's rate of consumption of the purchased food. In an embodiment, the inventive system can automatically reorder replenishment of pet food based on what a pet consumes or a rate of food consumption. Running out of food at an inopportune time can cause owners stress and worry. Not feeding the dog the same kind of food can be a source of stomach distress for pets or the opposite, eating the same food over an extended period of time may cause the pet to tire of the food or possibly even develop an allergy to the food.

According to some embodiments, the inventive system is designed to help owners take better care of their pet (e.g., dog) by understanding more about their pet's status/wellbeing/behavior in real-time, observing and objectively measuring and monitoring their eating and drinking habits which can include caloric intake and every food ingredient ingested. In an embodiment, the inventive system can improve the nutrition of the pet by helping owners understand what is in the food that is fed to their dog and explaining how other vitamins, nutrients or new foods/oils might address health problems, allergies, stomach issues or even help them live longer. In some embodiments, the inventive system can be used to manage feeding schedules and amounts for a diet or hydration regimen. The inventive system can also help to coordinate the care of a pet in a multi-person household or with multiple pet caretakers, which can include owners and pet service providers such as dog-walker. The inventive system can manage the pet's care through a phone, text and/or social media messages in real-time, from anywhere. The device also manages and communicates the pet's needs such as: reminding pet owners to feed them, guiding them on how much to feed them and when to refresh their drinking water. If there is a dog food recall or a sudden change in behavior like an increase in drinking over a short period of time, the app and device will give instant alerts to protect the animal and to draw the owners' attention to an emergent concern.

The inventive system includes a smart pet bowl that monitors and manages a pet's health and care in real-time. The WiFi connected bowl combined with the smart app and cloud infrastructure offers proactive care, personalized to the pet's food and water consumption, kind of food (raw, wet, dry), brand of food, age, size, activity level and breed, family habits and changing schedules.

The inventive bowl system can be a central device in any home that captures exhaustive amounts of data about a pet's eating and drinking behavior. The bowl can include components, which monitor wet, raw, freeze-dried and dry food in addition to water. Combined with the cloud functionality, the inventive system can help optimize a pet's nutrition and hydration by informing the pet owner about what the pet is eating and drinking, establishing trends over time and comparing consumption to other dogs of the same breed, location, environment, ambient temperature, age or size or to nutrition recommendation.

The inventive system tracks what is fed to the dog and signals a local or remote human user when enough has been put in the bowl (so a person filling the bowl knows when to stop filling the bowl). The system tracks when the bowl was last filled and reminds a human user to refill or change the water/fluid/food if the refilling has not been performed per schedule. The bowl stores a schedule based on user set preferences and communicates using lights whether the pet has been fed or not, or needs to be fed.

The inventive system enhances pet health and wellness especially nutrition and hydration for dogs while helping their human owners manage the pet's care. Many humans relate their pet's health and wellbeing to their own health and state of mind. The bowl helps humans manage schedules and communication with caretakers, re-ordering food before it runs out and having it delivered to their doorstep (or mailbox) or reminders to pick it up while in a specific retail store, or when passing by a pet store or specific location, in addition to monitoring the water and food intake by the pet. The inventive system also helps manage security/care of the animal since what, how and when a pet eats or drinks is a major indicator of health, status and care. Having a human know in real time whether the dog has been fed or given water provides instant reassurance and peace of mind or emergency alerts. The bowl can also remind and/or alert others that there may be a problem if the feeding schedule has not been followed or the pet has not eaten the normal quantity of food for a period of time.

A pet's owner can use data from the smart bowl system to understand what the pet is eating, establish trends over time and compare food consumption to other dogs of the same age or size or to nutrition recommendations. The smart bowl system tracks the food that is fed to the dog and transmits a "full serving" signal to a local or remote human user when precisely one full serving for that scheduled feeding has been put in the bowl. This signal is provided in real time so a person filling the smart bowl knows when to stop filling the smart bowl with pet food. The system tracks when the smart bowl was last filled and reminds a human user to refill or change the water/fluid/food if the refilling has not been performed in accordance with a stored feeding schedule. The smart bowl, server and smart phone can store a feeding schedule based on user set preferences and communicates using an output such as lights on a base portion of the smart bowl system to indicate whether the pet has been fed or not, or needs to be fed.

BRIEF DESCRIPTION OF THE DRAWINGS

FIGS. 24 and 25 illustrate an embodiment of a smart bowl used with an access restriction cover.
FIG. 26 illustrates an embodiment of a smart bowl used with a feeder mechanism.

DETAILED DESCRIPTION

It should be appreciated that the present invention can be implemented in numerous ways, including as a process, an apparatus, a system, a device, a method, or a computer-readable medium such as a computer-readable storage medium or embedded system containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), embedded firmware, or any magnetic, electromagnetic, infrared, optical, non-volatile memory or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware, firmware download update over the WiFi or RF connection, or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention. Although the terms, bowl and smart bowl are used throughout this patent application, the described apparatus, systems and methods can be used with any other types of food and water holders including: plates, food and water dispensers, feeders, etc.

Figure 1:
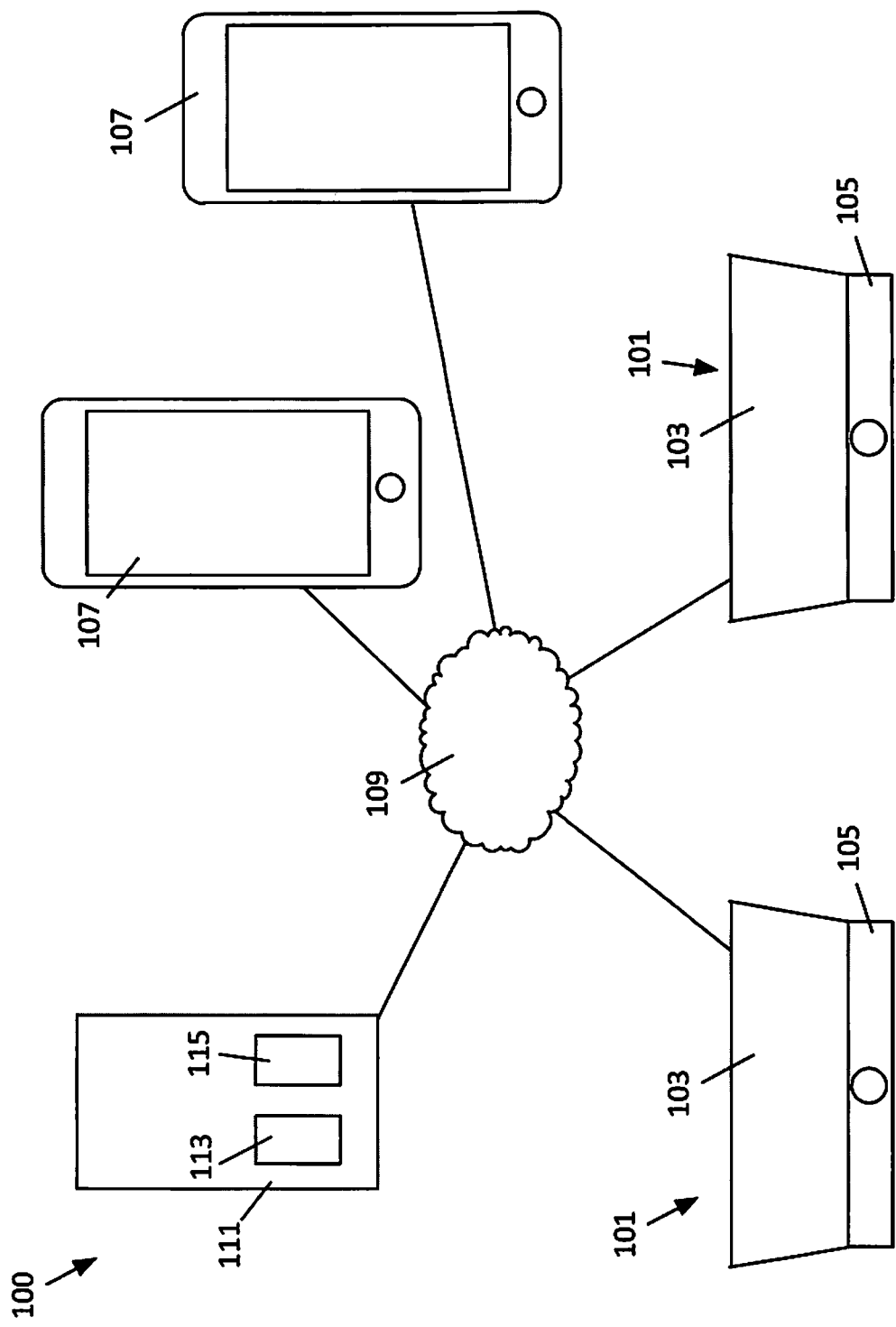
FIG. 1 illustrates an embodiment of a smart bowl system.

FIG. 1 is a system architecture illustrating one embodiment of a data storage system. Storage System 100 includes server 111, one or more computing devices 107 and one or more smart bowls 101. In some embodiments, the server 111, computing devices 107 and smart bowls 101 may be in communication using a dedicated communication link, one or more networks, a local area network, a wide area network, a storage area network, the Internet, a wired network, and/or wireless network, machine to machine network, among others. Server 111 can include a processor 113 and a database 115. The server 111 may be connected to multiple storage devices through different connectors and over various types of connections. The computing devices 107 can be any user operated computing device having a processor, user interface, and memory. The computing devices can include: embedded systems, human or animal activity trackers, accelerometers, smart phones, tablet computers, or any other type of computer or sensor. The smart bowls 101 can include a bowl 103 for holding pet food or water and a base 105, which supports the bowl 103. The bases 105 can include processors and communication mechanisms for transmitting data to the server 111, WiFi modules, RF connection and computing devices 107. In an embodiment, a smart bowl application software program can be downloaded from the server 111 to the computing devices 107 and stored in memory on the computing devices 107. The system described herein may be implemented using software, hardware, and/or a combination of software and hardware where software may be stored in an appropriate storage medium and executed by one or more processors.

Figure 2:
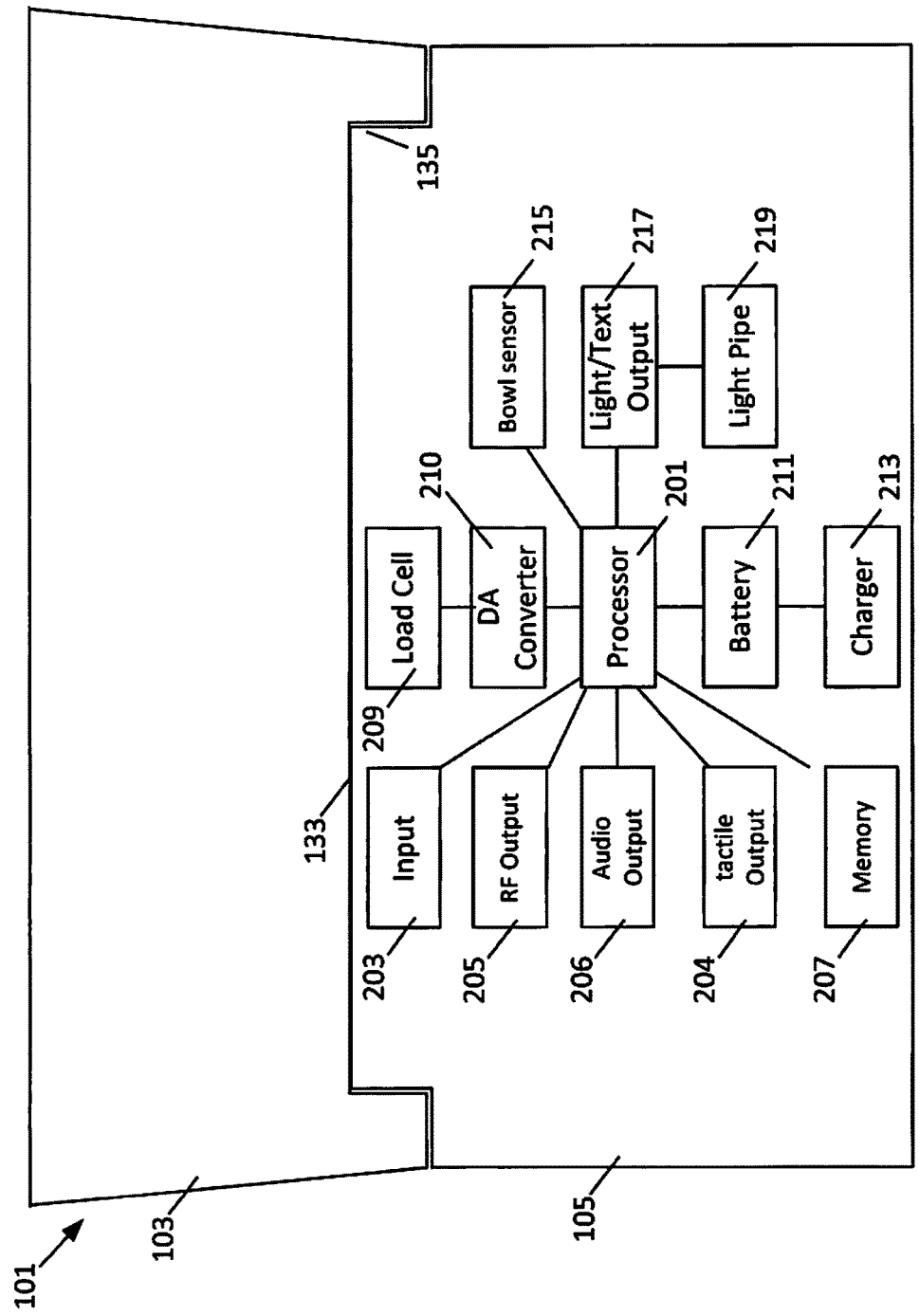
FIG. 2 illustrates a block diagram of an embodiment of a smart bowl.

With reference to FIG. 2, a block diagram of an embodiment of a smart bowl 101 is illustrated. The smart bowl 101 can include a bowl 103 for holding food or water, which is placed on a base 105 which can monitor the weight of the bowl 103. The bowl 103 can be made of a durable microwave and dishwasher safe material such as plastic or ceramic. Alternative bowl materials include: stainless steel or other suitable materials.

The bowl/container (may be flat or considered a dispenser) 103 can be available in various sizes depending upon the size of the pet using the smart bowl 101. For example, a small bowl 103 may hold 2 cups, a medium bowl 103 may hold 3.5 cups and a large bowl 103 may hold 5 cups. In other embodiments, the bowls 103 can be made in any other suitable sizes.

In an embodiment, the bottom of the bowl 103 can have features, which allow the bowl 103 to be securely held in place on the base 105. For example, the bottom of the bowl 103 can have a recessed cylindrical volume 133 and the top of the base 105 can have a corresponding cylindrical feature 135 that fits within the recessed volume 133 of the bowl 103. The inner diameter of the recessed cylindrical volume 133 can be slightly larger than the outer diameter of the top cylindrical feature 135 of the base 105. When the bowl 103 is placed on the base 105, the bowl 103 will be securely held in place on the base 105. In other embodiments, any other geometric features can be formed on the upper surface of the base 105 and the lower surface of the bowl 103 to prevent the bowl 103 from being easily removed from the base 105 by the pet due to horizontal or downward forces.

A load cell 209 can be mounted to an upper surface of the base 105 so that it can be used to weigh the bowl 103 and the food or water held in the bowl 103. The load cell 209 can be a strain gauge that measures the deformation (strain) as a change in electrical resistance, which is a measure of the strain and hence the applied forces. A load cell can consist of one or more strain gauges. The electrical signal output of the load cell 209 can be in the order of a few millivolts and can be converted to a digital signal by a digital/analog converter 210 for processing by the processor 201.

The bottom surface of the base 105 can have a sturdy rubberized surface, which provides a high coefficient of friction to prevent the smart bowl 101 from sliding on a smooth surface. In an embodiment, the bowl 103 is easily detachable from the base 105 allowing easy cleaning of the bowl 103.

Various electrical components can be housed within the base 105 including: a processor 201 which can be coupled to various system components including: an input 203, a tactile output, an accelerometer, light sensor, temperature sensor, motion sensor, sound sensor, a radio frequency (RF) output 205 like a WiFi module or BLE chip set, an audio output 206, memory 207, load cell 209, a battery 211 which can be charged with a charger 213, bowl sensor 215 and a light output 217 which can be coupled to a light pipe 219. The load cell 209 can be used to measure the weight of the bowl 103. The input 203 can be a button, which can allow a user to press the button to cause the processor 201 to output information through the light output 217. For example, in an embodiment, the base 105 can be configured to indicate if the pet has been fed when the input 203 button is pressed. The processor 201 can respond to an input button 203 by illuminating the light output 217 in a color that indicates the feeding status. For example, in an embodiment a green light output 217 can indicate that the pet needs to be fed and a red light output 217 can indicate that the pet has been fed and does not need to be fed at this time. In an embodiment, the light output 217 can be a light emitting diode (LED) that can output multiple colors of light such as: white, yellow, blue red and green.

In an embodiment, the small bowl 101 can be configured to store a feeding schedule for the pet, which can be stored in (non volatile) memory 207. The stored feeding schedule can be used by the processor 201 to provide feeding reminders to the pet caretakers. At the scheduled feeding times, the processor 201 can transmit feeding signals to the RF output 205 which can transmit feeding reminders to the pet caretaker. The feeding signals can be text and/or email messages informing the caretaker to feed the pet. In an embodiment, the processor 201 can illuminate the light output 217 and/or emit an audio signal through an audio output 206 which can be a speaker, buzzer, or other output devices such as a tactile output 204 which can be vibration, buzzer or other mechanical output to remind the caretaker to feed the pet. These base 105 controlled outputs can follow the pet's feeding schedule stored in memory even if there is a power outage and wireless communications with the smart bowl system server and mobile computing device are disrupted. These base 105 controlled outputs and memory 107 can also be updated over RF through the cloud system and database.

The caretaker can place food in the bowl 103 and the load cell 209 can monitor the quantity of food being placed in the bowl 103 based upon the weight detected by the processor 201. As food is placed in the bowl 103, the load cell 209 can output a signal indicating the increased weight of the food. In an embodiment, the feeding schedule can include a weight of food for each feeding of the day. The caretaker can place food in the bowl 103 and the processor 201 can respond to the food placement by illuminating the light output 217 in a color indicating the need for more food. When the proper quantity of food is placed in the bowl 103, the processor can change the color of the light output 217. For example, when more food is required, the light output 217 can be illuminated in green and when the proper quantity of food has been placed in the bowl 103, the processor 201 can cause the light output 217 can be changed to red or any other programmed light output color indicating the proper food quantity. In an embodiment, the light output 217 can be coupled to a light pipe 219 which can extend partially or fully around the circumference of the base 105 to that caretakers can view the light pipe 219 from any angle relative to the smart bowl 101.

In another embodiment, the smart bowl 101 may also include a bowl sensor 215 which can be used to monitor the food placed in the bowl. For example, in an embodiment the bowl sensor 215 can be used to determine if the bowl contains water or dry food or wet food. The bowl sensor 215 can then transmit a signal to the processor 201 indicating that the bowl 103 contains water or food so that the processor 201 can provide the proper feeding or water filling signals based upon the contents of the bowl 103. In an embodiment, the bowl sensor 215 can identify wet pet food and detect the temperature of the food. Many wet pet foods are preferably served at room temperature since some pets may not like to eat cold food. In an embodiment, the smart bowl can be configured to notify the caretaker when the wet food is served at a detected temperature below a preset temperature range though a bowl base output or message to the computing device. The user can then place remove the bowl and food from the base and microwave the contents for a few seconds. Alternatively, if the food is too hot, the smart bowl 101 may emit an alarm to communicate to the caretaker to keep the food away from the pet until the temperature has dropped to a safe level.

In an embodiment the smart bowl may have an attachment, or insert, that the animal will lick repeatedly (e.g. because there is a sweetener contained inside) and that will collect samples of saliva and spittle. From the collected sample a dog's DNA, metabolism/caloric rates can be gathered for further analysis (e.g. mailed to a laboratory or delivered to a veterinarian office.) From this an animal's ideal nutrient profile can be gathered.

A major limitation in helping animals is that they cannot talk to their caretakers. The pet parents therefore rely on observation to assess their pets' health and wellbeing. Small changes can be overlooked or subjectively attributed to other causes. The modular system enables objective measurement previously not possible. Biometrics may be gathered from the modular system which can be collected and then compared to a database of like-kind animals in similar environments, e.g. latitude/longitude, ambient temperature. To gather this data, the system may include Inserts or attachments like a thermal scanner, infrared camera, optical scanner, camera, thermometer/temperature gauge, additional load cell or force plate. Any of these devices can be used to observe, measure and monitor individual changes in an animals' behavior, gait, stance as bowl is approached (e.g. is the cat crouching?), head position, pressure disbursement, whisker twitching, time spent eating, paw print, paw pad temperature, length of toenails/claws to assess their health and wellbeing, muscular strength, orthopedic pain level, stress/anxiety level, comfort or agitation. This data will be sent to the cloud database and compared and contrasted to other animals with comparable characteristics to predict or diagnose health or behavioral issues. The modular system therefore provides a minimally invasive means for gathering data and samples to establish a highly personalized log of the animals day to day characteristics, behavior, biorhythm, benchmarks and norms. Comparing this data to other animals will be used for predictive modeling of early warning signs and to diagnose health problems earlier than a human might have been able to observe them. Early diagnosis is a key factor in the success rate of preventing disease, and the system will be acting as an early warning system to help head off problems early.

The smart bowl 101 may also determine how long the food has been in the bowl. If the food has been in the bowl for longer than a predetermined time period, the smart bowl 101 can indicate that the food may not be suitable for pet consumption and should be thrown out via a bowl base text or light output or message to the computing device. Some types of wet food may go bad more quickly in hot temperatures. The smart bowl 101 can monitor the temperature of the food and time exposure to the heat. The smart bowl 101 can then indicate when the wet food should be thrown out.

In an embodiment, the bowl sensor 215 may include a temperature sensor that may be able to detect a temperature of a pet. In an embodiment, the bowl sensor 215 may include a temperature sensor can be a thermometer or other temperature sensing device such as an infrared optical temperature sensor. Because the pet will be eating, the temperature sensor may have direct access to the interior of the pet's mouth, which may result in a more accurate body temperature measurement. The smart bowl 101 may store the normal body temperature of the pet. If there is a deviation from the normal body temperature, the smart bowl 101 may transmit a message to the caretaker's computing device indicating that the pet has an elevated body temperature, which may indicate that the pet is sick and should be taken to a veterinarian for a check up.

In some embodiments, the bowl sensor 215 can include particle sensors which can detect problems with the food and/or water including: bacteria, parasites, insect or rodent infestation, contaminants, etc. When problematic materials are detected, the smart bowl 101 can then indicate when the wet food should be thrown out with bowl base alarms and/or messages to the caretaker computing devices.

In other embodiments, the bowl sensor 215 can detect other physical characteristics of the bowl contents. For example, the bowl sensor 215 can include a pH level sensor that can provide a record of the user's pH level of the water within the bowl 103. Some caretakers use drinking water additives, which can be formulated to help freshen your pet's breath and maintain oral hygiene in conjunction with regular home dental care for the pet. In some cases, adding too much of the water additive can alter the pH level of the water. A normal neutral pH level of about 7 is important for the growth of healthy bacteria. However, a pH level that is more acidic will cause the healthy bacteria to be replaced with unhealthy bacteria that can cause tooth decay. The pH level bowl sensor 215 can determine if the pH level in the bowl 103 and the pH level signal can be transmitted to the processor 201 which can emit a warning signal when the pH level drops below 5.5. If the pH level is outside of an acceptable range, the processor 201 can output a warning signal to the light output 217 and/or the RF output 205. The caretaker can respond by disposing of the water and replacing it with fresh water.

The components of the base 105 can be powered by one or more batteries 211. For example, in an embodiment, the batteries 211 can include four AA size batteries, which are mounted in a battery holder in the base 105. The batteries 211 can be coupled to a charger 213 which can keep the batteries 211 charged. The charger can be an alternating current (AC) adapter, which provides direct current (DC) electrical power to charge the batteries 211. In another embodiment, the charger 213 can be a universal serial buss (USB) connector or a solar panel, which converts light into DC electrical power to charge the batteries 211. The solar panel can provide electrical power to the batteries 211 during the day and the stored power in the batteries can power the smart bowl 101 at night when the solar panel is not producing electrical power.

Figure 4:
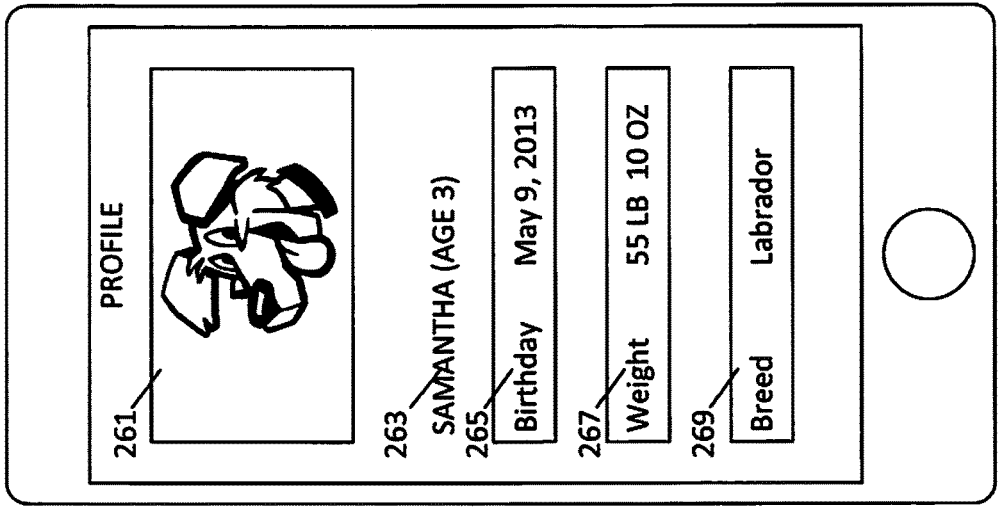
FIG. 4 illustrates an embodiment of a user interface on a computing device displaying pet information.
Figure 3:
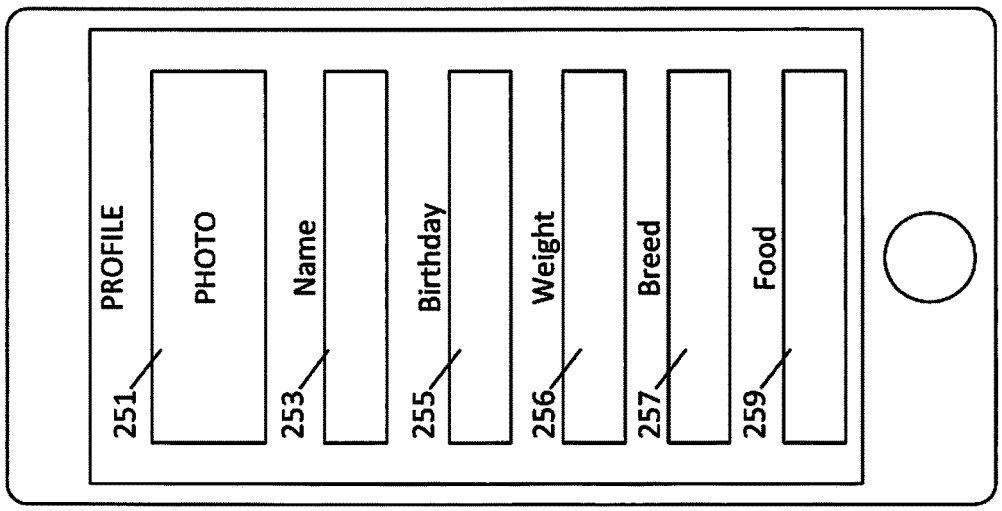
FIG. 3 illustrates an embodiment of a user interface on a computing device for inputting pet information.

When a pet caretaker uses a smart bowl 101, the system can be configured so that the bowl(s) 101 can communicate with the server 111 and the mobile computing devices 107 as illustrated in FIG. 1. The process can include inputting information for the pet through the mobile computing device 107. With reference to FIG. 3, a mobile computing device is illustrated with a user interface for inputting pet profile information. In this embodiment, a user can input a photo of the pet in the photo input 251, the name of the pet in the name input 253, the birthday in the birthday input 255, the weight of the pet in the weight input 256, the breed in the breed input 257 and the food that will be used with the smart bowl in the food input 259. With reference to FIG. 4, once the pet data is input the user interface of the computing device can display the photo of the pet 261, the name of the pet with the age 263, the weight of the pet 267 and the breed of the pet 269.

Figure 5:
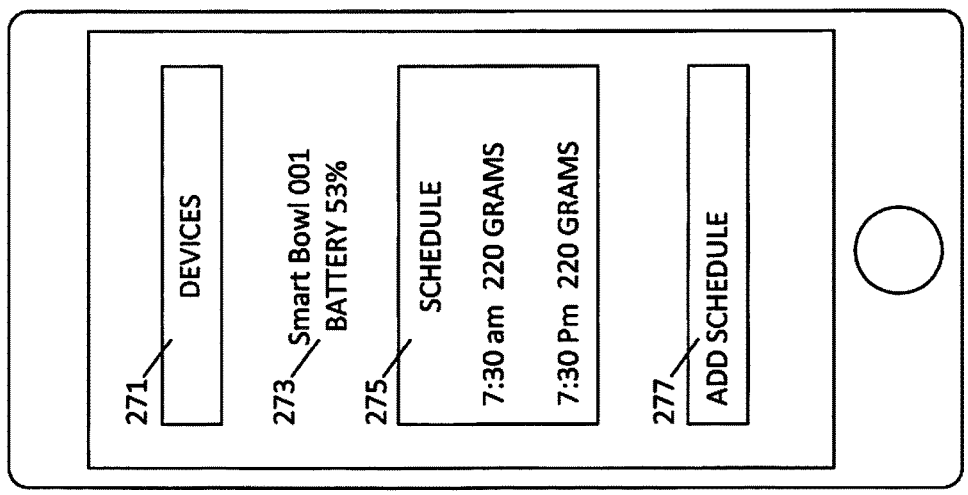
FIG. 5 illustrates an embodiment of a user interface on a computing device for inputting pet feeding scheduling information.

As discussed with reference to FIG. 2, the smart bowl can include a processor, which is coupled to a battery and an RF module and transmitter. The smart bowl system can be configured with a feeding schedule that can be stored in memory on the pet bowl, the computing device and/or the server and updated by any one of the other devices like a phone or push notification. With reference to FIG. 5, the processor of the bowl can determine the charge level of the battery and transmit this information to the mobile computing device, which can display the battery charge information. In this example, the user interface is displaying a charge level of 53% for Smart Bowl 001 273. If the battery runs low, the user interface can remind the user to charge the battery. The user can click on the "Devices" button 271 to select any other smart bowls in the user's smart bowl network. The feeding schedule for Smart Bowl 001 can be input through the user interface by clicking on the Add Schedule button 277 and then typing in the feeding time and the quantity of food to be fed to the pet. In this example, the user has input a first feeding at 7:30 AM of 220 grams of pet food and a second feeding at 7:30 PM of 220 grams of pet food.

Figure 6:
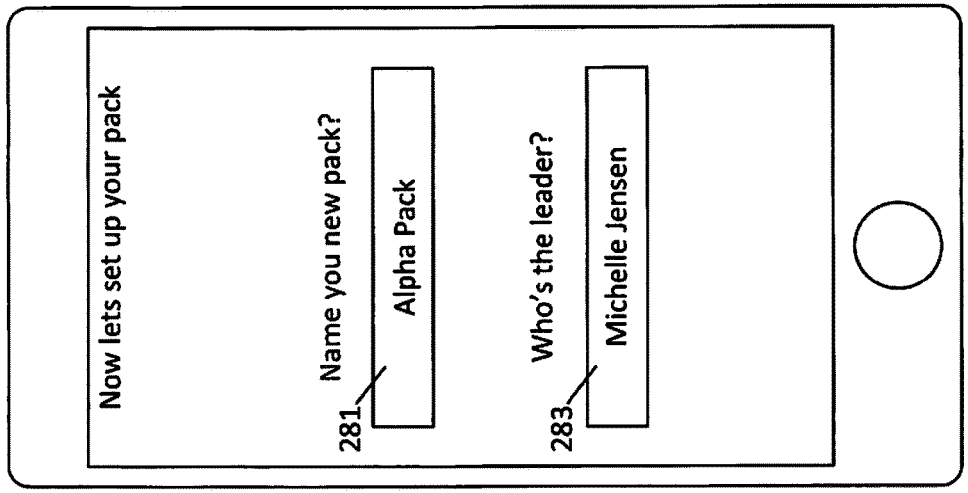
FIG. 6 illustrates an embodiment of a user interface on a computing device for inputting pet social network pack groups.
Figure 7:
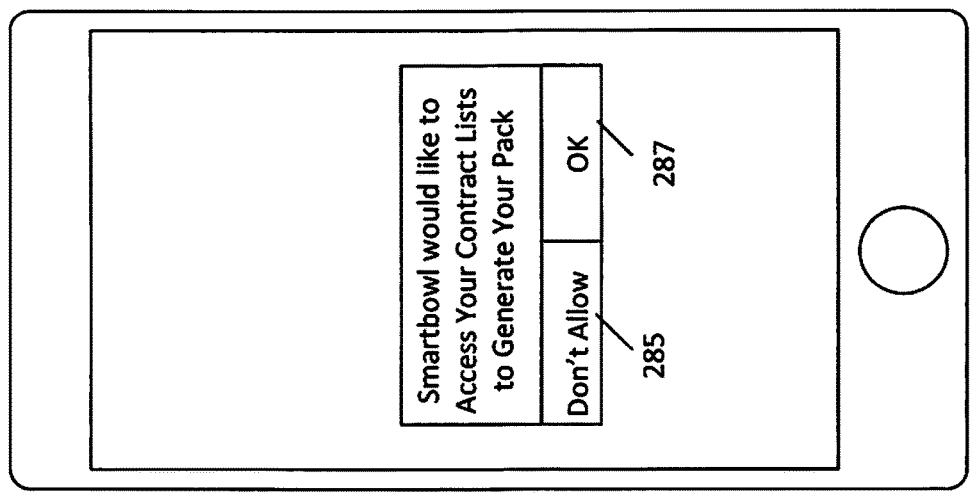
FIG. 7 illustrates an embodiment of a pop-up message on a user interface asking for contact list access authorization.

The smart bowl system can also be used with pet and/or human social networks. With reference to FIG. 6, the user interface can allow the users to setup a social network "pack." The user can name the pack in the pack name input 281. In this example, the user has input "Alpha pack". The user can then input the leader of the pack in the leader input 283. In this example, the user has input the leader name, Michelle Jensen. With reference to FIG. 7, in an embodiment, the user interface can request access to the user's contact list. The user can click on the "OK" button 287 to allow the system to access the user's contact list on the user's mobile computing device or click the "Don't Allow" button 285 to prevent the system from accessing the contact list.

Figure 8:
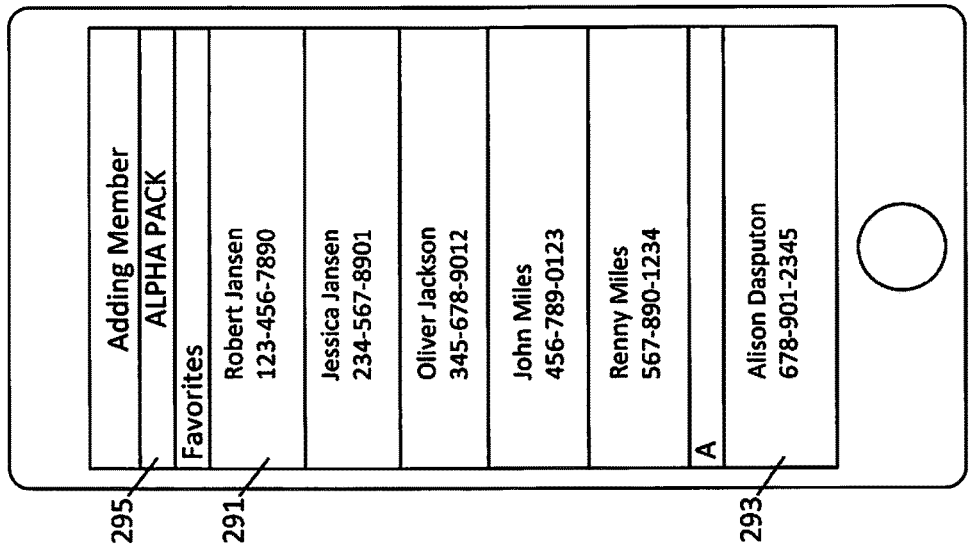
FIG. 8 illustrates an embodiment of a user's contact list on a user interface.
Figure 9:
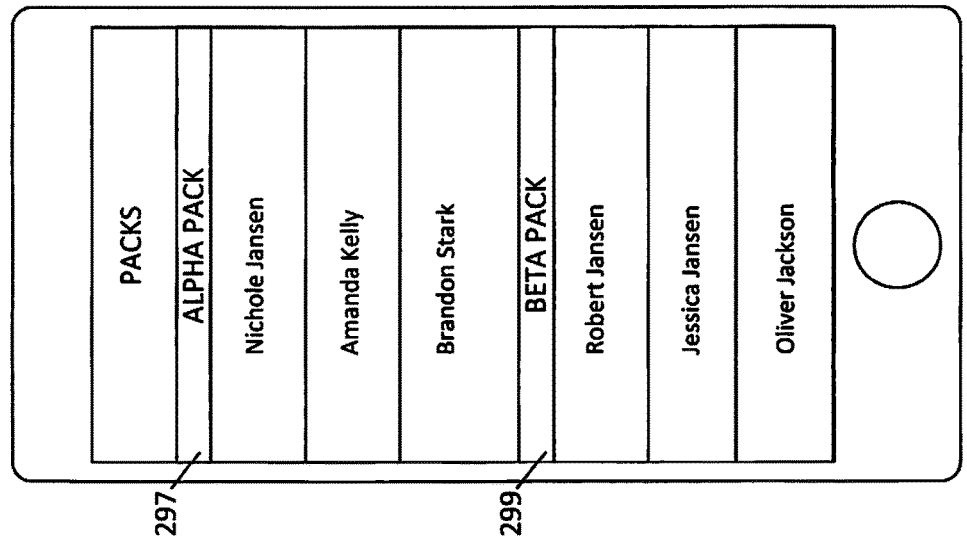
FIG. 9 illustrates an embodiment of pet social network pack group listings on a user interface.

If the user allows access to the contact list, the user interface can display the user's contact list, which can be added to a selected pack. With reference to FIG. 8, the user can select a desired pack in the pack select button 295. In this example, the user is selecting members for "Alpha Pack". In this example, the user's contact list can include favorites from the contact list 291 which can include the names of contacts that are most often contacted by the user. The favorite contacts 291 can be listed first. The user interface can then display the remaining contacts in alphabetical order or order of contact priority. The pack becomes a 'responsibility ladder' communicating to the person in charge of the animal and the rest of the group. Should one person fail to administer care, like refill the water dish, the next person in the responsibility ladder will be communicated with by phone, text, email or other method. In the illustrated example, the "A" names are listed 293 below the favorites 291. The user can swipe the list up or down to move through the list of contacts. The user can click on the names in the contacts list to add the members to the user's pack. With reference to FIG. 9, once the user's pack members have been input, the user interface can display the members of the user's packs. In this example, the Packs page of the user interface displays both Alpha Pack 297 and Beta Pack 299 members. The user can swipe up or down over the Alpha Pack and Beta Pack members to scroll through the members.

In an embodiment, a pet's pack can be a group of caretakers assigned to the same pet or the same bowl and the pack can be set up through the contacts list on the smart phone computing device. The pet's pack can correspond to the phone tree/communication ladder/hierarchy for any given pet. An 'alpha' can be a primary caretaker(s), main owner, key person who wants the most information about the dog. The system can be configured for auto-messaging to the 'alpha' when tasks are completed. The rest of the caretakers can be "beta" pack members. The other caretakers may perform one or more caretaker functions as designated by the caretaker privileges defined by the 'alpha' caretaker. The order, in which their contact information is set up, sets the rules for them being reminded or designated as the caretaker based on status, and optionally the caretaker privileges assigned to them. For an alternate caretaker, the bowl reminds him that it is time to feed the dog and signals when the right amount of food has been put in the bowl. For example, the base light may be green when food is needed and as the food is placed in the bowl the light can turn red to signal stop filling. For primary caretakers, a button on the base of the bowl can be pressed to interrogate the bowl. The smart bowl can respond by emitting signals indicating if the pet has or has not been fed according to the stored feeding schedule. If the caretaker status is away, the smart bowl system can transmit notifications to alternate caretaker(s) who can be: kennel, dog walker, teen pet sitter, etc. Because these care takers may not live in the pet's residence, the Feeding schedule reminders can be within time range of pre-set or learned schedule. The messages sent by the server to the secondary caretakers may include feeding instructions which can include food amount, stop filling signals emitted by the bowl, keep filling signals emitted by the bowl, and change water.

In an embodiment the smart bowl can have adaptive priorities. The smart bowl and app alert caretaker based on learned or pre-set schedule, personal preferences or push notifications in the case of emergency. Default will be reminders are given a predefined amount of time (e.g., 2 hours) prior to meal time when in away mode. The predefined amount of time can be input through the reminder preferences. In different embodiments, the server can transmit multiple reminders to the same or different caretaker if a specified action has not been taken within a specified interval of a prior reminder. For example a first reminder can be transmitted if a caretaker has not taken an instructed action like changed the water or feed the dog within a predefined amount of time, for example 60 minutes. This predetermined time can be a default setting or customizable as a user preference setting. If action is not performed and detected by the smart bowl, the caretakers cam be reminded again either by text, within the app running on the mobile computing device or other communication preferences such as email or phone call. In an embodiment a second reminder can be configured if a pet has not been fed 30 minutes (or any other set reminder time) after the first reminder.

If the first caretaker is not responsive to the first and second reminders, the smart bowl system can contact the next designated caretaker. In an embodiment, the caretakers can be ranked in a hierarchy list of caretakers. The smart bowl system can transmit a message to the next caretaker indicating that the first caretaker was not responsive and requesting the second caretaker to perform the pet feeding. The feeding reminder process can then be repeated and if a secondary caretaker fails to perform a predefined action within a specified interval of time of providing a given reminder, for example feeding the pet within 30 minutes of a given reminder the smart bowl system can provide a subsequent reminder to the next caretaker. The smart bowl system can continue following communication ladder based on rules set up by the system user for the pet. All actions and messages transmitted between the smart bowl system and the caretakers are tracked within the application on the computing device and in the cloud by the server.

In an embodiment, the user may wish to travel with the smart bowl and the smart bowl system can have location based rules to change the operation based upon location. The user may also have more than one bowl, but have his phone accompany him so that changes in position can be assessed/attributed using geofencing, altitude, latitude and longitude coordinates or time zone for example. In an embodiment, the location of the smart bowl can be determined by the WiFi IP address being used by the smart bowl. When the smart bowl is moved to a new location the smart bowl can connect to the new location's WiFi network to communicate with the smart bowl's server. In an embodiment, the smart bowl can be configured with different sets of rules defined for different location coordinates of the bowl. In other embodiments with reference to FIG. 23, the location of the pet bowl 101 can be measured with a location sensor 453 which can be a GPS or other location tracking sensor on the bowl 101. In an embodiment, the smart bowl may implement geo-fence or GPS detection of location/rules based status. For example, the smart bowl 101 may determine that the location is at home based on the location sensor 453 output. Alternatively, the smart bowl 101 may determine that the location is away from home and apply other operating rules depending upon the detected location. Different smart bowl operating rules may be applied at each of multiple different predefined locations such as at: pet kennel, dog park, with Grandma, etc. based on the bowls location or most likely the owners location as indicated by a smart device that accompanies him—like a smart phone, fitness tracker, tablet or computer. Each of these locations may have different messaging settings so that the feeding reminders and feeding instructions are sent to the proper location caretaker(s). This communication can be via bowl, smart bowl app, text and/or email messages to the designated caretaker's smart phone computing device.

The social network is not only derived from the location of the bowl, but it is also derived from the behaviors of pack members and the associated devices that they have with them. For example, if the Pack leader's phone (with the smart bowl app on it) senses that the primary caretaker is no longer with the dog (like at altitude on a plan for an extended period of time), it can automatically designate alternate caretakers and their associated instructions, rules and communication preferences. Another example would be if a smart thermostat or smoke alarm, like a Nest, sensed that the family was gone but the dog remained at home. The Bowl could emit emergency signals or trigger alerts to neighbors if the smoke alarm is triggered, enabling rescuers to know that there was an animal inside that needed to be rescued.

If the smart bowl system and app detects that the location is 'home', it can use the default settings for 'Home' and the system may not proactively remind the 'alpha' pack caretakers but logs all events and activity and communicates based on the 'alpha' pack's preferences. Other status rules can be defined by the smart bowl system user and the defined rules can trigger subsequent bowl and app communication. For example, if the smart bowl system and app detects that the bowl is at Grandma's house, the reminders can be emitted with sound or rapid blinking ever 30 seconds instead of every minute as this might be more effectively responded to by the caretaker at this location.

In different embodiments, the classifications of the smart bowl rules can include local notifications and/or alerts provided via the smart bowl/base. The notifications or alerts can be visual via lights and/or text, audio outputs such as musical or speech messages, tactile, any combination thereof may be communicated locally via the bowl to communicate with a local caretaker. Examples of such local alerts include: visual alerts provided via LED/LCD displays or other visual indicators. For example, LED color-based notification, LED brightness-based indication, duration of LED on period, periodicity of blinking of LED, message written on an LCD display on the bowl or base, etc. The audio outputs can be: audio musical, tonal, or speech alerts provided through a speaker provided on the bowl or base. The tactile alerts can be mechanical vibration signals provided through a buzzer or other mechanical actuator. In some embodiments, different alert conditions may trigger different forms of notification locally from the bowl. For example, first reminders or less urgent notifications may include/trigger visual notifications; second reminders or moderately urgent notifications may include/trigger tactile notifications; higher order (third or higher) reminders or high urgency notifications may include/trigger audio notifications. The properties of visual, tactile and/or audio notifications may also depend on the nature of alert condition. For example, the periodicity, intensity, repetition rate, content, etc. may vary based on urgency of notification.

Some examples of visual local notifications and corresponding alert conditions can include: high intensity flashes of red light for urgent situations. In contrast, scheduled reminder notifications can be a green light emitted in 10 second durations over several minute until the feeding of food and/or water are addressed and detected by the smart bowl(s).

As discussed, the light output can be used to indicate when the proper amount of food is placed in the smart bowl. The smart bowl can determine that food needs to be put in the smart bowl and the processor can cause the light output to illuminate green. The base light output can remain green as the food or water is placed in the smart bowl. When the proper amount of food has been placed in the bowl, the light output color can change to red. For example, the stop visual signal can be a solid red light for 10 seconds or any other set time period.

In order to only measure the food being placed in and removed from the smart bowl, the processor can go through a tare process so that the weight of the bowl is not weighed. This can be selected through an input on the base or through the mobile computing device. The base can display a solid white light for 5 seconds then blink white twice. The empty bowl can then be placed on the base and this weight measurement can be set to a zero weight value before food is placed in the bowl.

In some cases, the smart bowl output notifications may be provided in response to a request for status from the human user. The human user may interrogate the bowl by way of a touch input, speech input, or any other suitable input and responsive to the human interrogation, the bowl may provide appropriate status information. Some examples of status information output from the bowl base provided in response to human interrogation (e.g., press button on bowl or base to inquire about bowl status) can include the status and light outputs listed in table 1 below.

TABLE 1

| Bowl Contents | Status | Light Output |
| --- | --- | --- |
| Food | Pet has been fed | solid red light for 5 secs. |
| Food | Pet needs to be fed | solid green light for 5 secs. |
| Water | Water level is good | solid red light for 5 secs. |
| Water | Change/add water | solid green light for 5 secs. |

Figure 10:
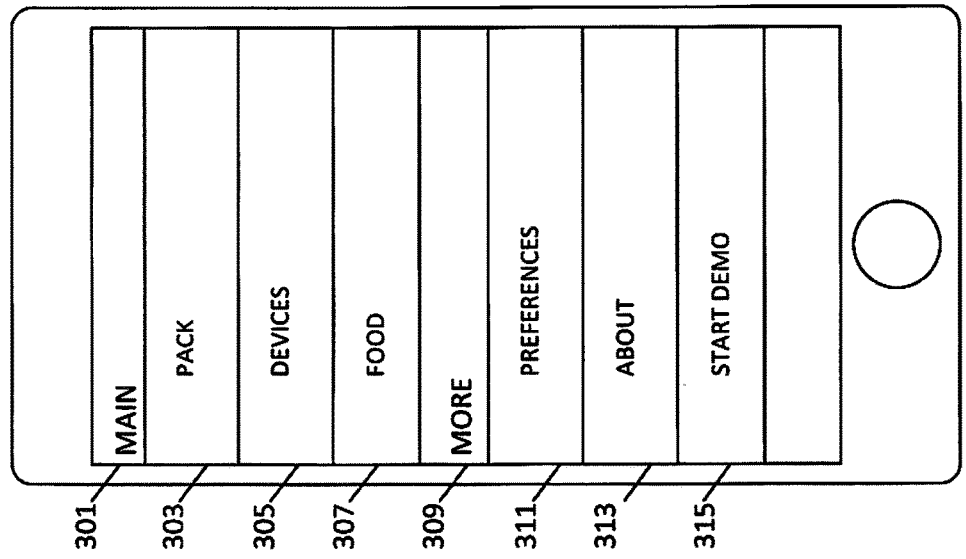
FIG. 10 illustrates an embodiment of a user interface menu.

Once the smart bowl system has been configured and the basic information for feeding and pack members has been input by the user, the system can allow access to various system features through a menu page. An embodiment of a menu page is illustrated in FIG. 10. In the illustrated embodiment, menu has been divided into a main section 301 and a more section 309. From the menu section 301, the user can access the pack page by clicking on the pack button 303, the devices page by clicking on the devices page 305 and the food page by clicking on the food page 307. From the more section 309, the user can click on the preferences button 311 to access the system preferences, the user can click on the about button 313 to access information about the smart bowl system and the user can click on the start demo button 315 to play a demo of the smart bowl system. In an embodiment, the demo can include instructions and/or tutorials for using the smart bowl system.

Figure 11:
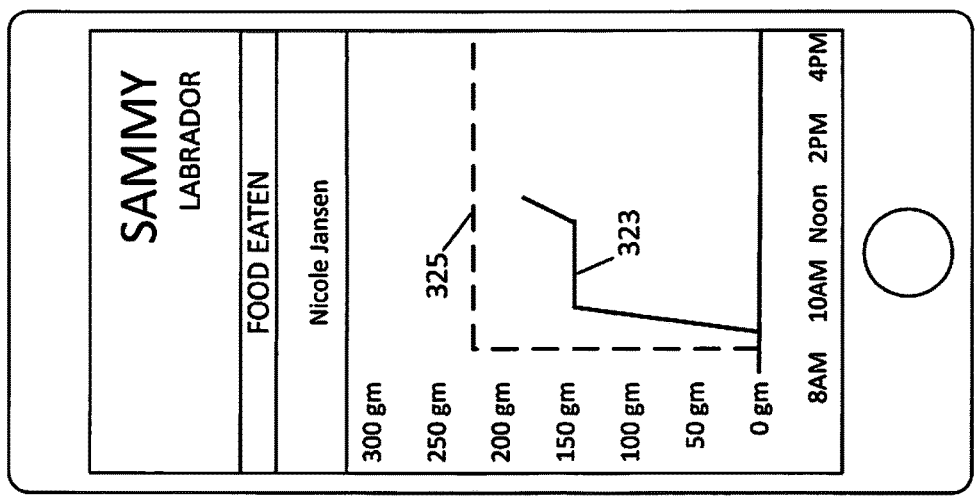
FIG. 11 illustrates an embodiment of a pet's real time food eating graph displayed on a user interface.

In an embodiment with reference to FIG. 11, the smart bowl system can display a graph representing the pet food consumed by the pet over time. The user interface can display the name of the pet and a graph representing the weight of the food consumed in a vertical axis and time in the horizontal axis. The graph line 323 can show the change of weight of the food in the bowl over time. In this example, the pet can start consuming food at about 9 AM and consumes about 150 grams of food. At about 9:30 AM, the pet can stop eating until about noon. In an embodiment, end of the graph line 323 can represent the current time, which can be about 12:30 in this example. As time elapses, the illustrated graph can scroll so that the current time remains within the viewable area of the graph.

In an embodiment, the graph can include a second line 325 that represents the total food placed in the bowl. In the illustrated embodiment, 220 grams of pet food can be placed in the smart bowl at about 8:30 AM. Thus, the line 325 can be 0 grams prior to 8:30 AM and the rise to 220 grams at 8:30 AM.

Figure 12:
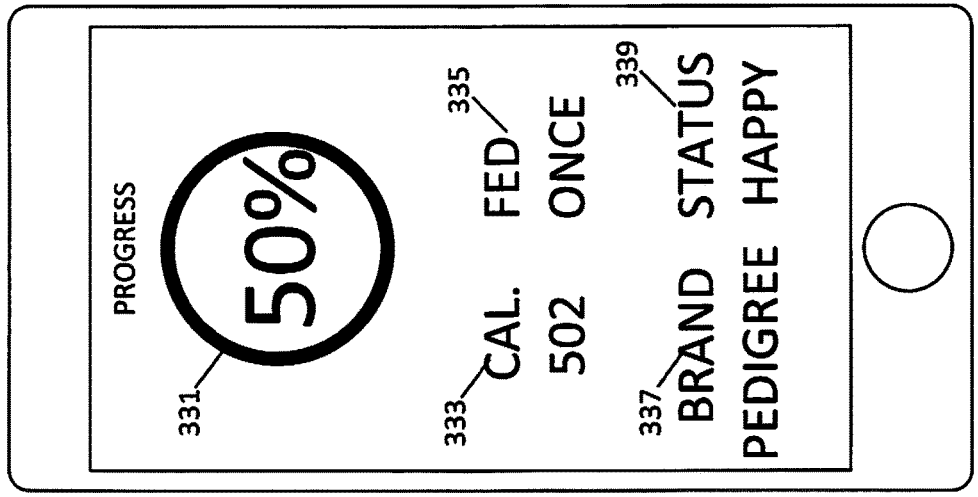
FIG. 12 illustrates an embodiment of a pet's food eating information displayed on a user interface.

With reference to FIG. 12, the user interface can display another feeding page, which shows the food consumption progress for a pet. The user interface can display the food consumption of the pet as a percentage of the food placed in the smart bowl 331. In this example, the pet has consumed 50% of the food placed in the smart bowl. The user interface can convert the percentage of food consumed into a calorie number 333. In this example, the user interface states that the pet has consumed 502 calories. The user interface can indicate how many times the pet has been fed 335. In this example, the user interface indicates that the pet has been fed once.

The user interface can include an input for the type or brand of food that is being used with the smart bowl 337. In this example, the brand of pet food is Pedigree. The brand and specific food being used with the smart bowl system can be input manually, selected from a listing of different foods, or input through an optical sensor. For example, in an embodiment, a user may photograph a container of food or the bar code of the container of food. The photograph can be compared to a database of pet foods to identify the brand and type of food being used with the smart bowl. The database can include additional information about the pet food including: calories/weight, protein/weight, fat/weight, vitamins and minerals/weight, etc. The system can be calibrated based upon the brand of pet food being consumed. In this example, Pedigree pet food can be input and the pet food database can provide information about the pet food. In this example Pedigree pet food can have about 1.32 calories per gram. In many households, the caretakers may server different types of food or mix different types of food or add dietary supplements. In an embodiment, the smart bowl system may With this information, the smart bowl system can identify the proper food weight servings based upon the type and weight of the pet. In this example, the smart bowl may recommend that a 3 year old 55 lb. 10 oz. female Labrador should be fed two meals of pet food per day with each meal having 1,004 calories to maintain this proper weight. The smart bowl system can then calculate that 758 grams of Pedigree pet food has 1,004 calories. The caretaker can place the Pedigree pet food into the smart bowl and the base can be illuminated green until 758 grams have been placed in the bowl. At this weight, the base can be illuminated red to indicate that the precisely correct amount of food has been placed in the bowl. The smart bowl can report the pet's food consumption. In this example, the pet has consumed 50% of the food placed in the smart bowl, which is 379 grams of food and 502 calories.

The feeding habits of the pet, which are monitored by the smart bowl system, can indicate the status of the pet. For example, a happy pet may have regular feeding habits and consume all of the food placed in the smart bowl. The pet's compliance with this regular feeding schedule can indicate that the pet is happy. In contrast, if the pet does not eat or substantially changes the eating habits, this can be an indication that there is a change in status or the pet may be sick. In an embodiment, the smart bowl can analyze the timing of the feeding of the pet and predict a status based upon the feeding timing. In an embodiment, the system can display this status 339. In this example, the pet may have eaten at a normal time(s) and the smart bowl interface may display the status as Happy.

Figure 13:
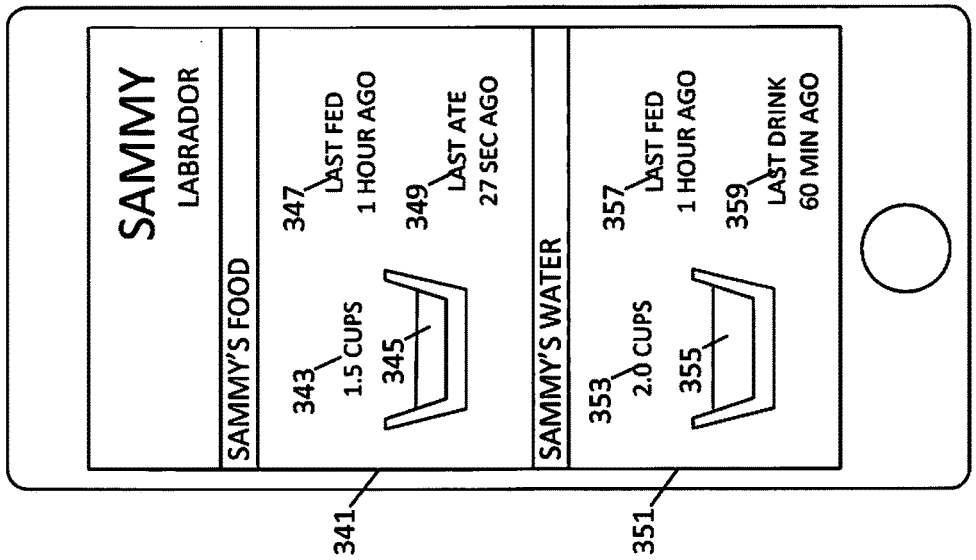
FIG. 13 illustrates an embodiment of a pet's food eating and drinking information displayed on a user interface.

With reference to FIG. 13, in an embodiment, the smart bowl system may include both a food bowl and a water bowl. The user interface can include a food bowl section 341 and the water bowl section 351 which include information about the food bowl and the water bowl. The food bowl section 341 can indicate the quantity of food that has been fed to the pet in text 343 as well as a graphical representation of the food currently in the bowl 345. The food bowl section 341 can also indicate the time that the pet was fed 347 and/or the last time that the pet ate 349 and how fast the pet ate/how quickly the food was consumed, how many times the pet drank water over time. In the illustrated example, the pet was fed 1.5 cups of pet food one hour ago and the pet ate the food 27 seconds ago. In an embodiment, the smart bowl can provide messages or reports indicating when the pet is consuming food or water abnormally. For example, the smart bowl can transmit an alert if the pet drank all of his water in 10 minutes vs. the normal habits of drinking all of his water over an entire 8 hour day.

The smart bowl can similarly provide information on the pet's water bowl. The water bowl section 351 can indicate the quantity of water that has been fed to the pet in text 353 as well as a graphical representation of the water currently in the bowl 355, the time that the pet was fed water 357 and/or the last time that the pet drank 359. In this example, the pet was fed 2 cups of water one hour ago and the pet drank the water 60 minutes ago and drank ⅛ of a cup of water in 45 seconds, which can be reflected as normal (or not) relative to historical trends.

Figure 14:
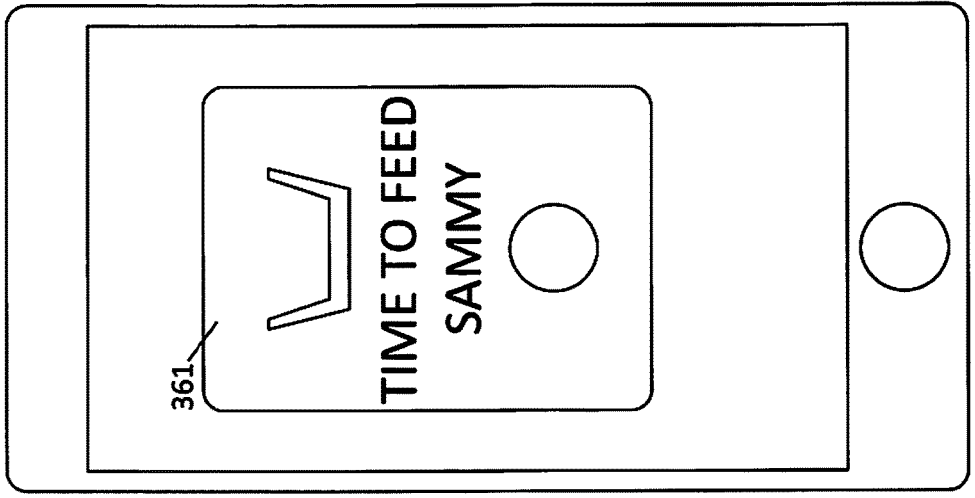
FIGS. 14-19 illustrate embodiments of feeding notifications and reminders transmitted to user interfaces on mobile computing devices.

As discussed, the smart bowl system can provide reminders to the user for feeding the pet. With reference to FIG. 14, the user interface can display a message that it is time to feed the pet 361. In this example, an empty smart bowl is illustrated with the message "Time To Feed Sammy." The user can close the reminder window and feed the pet. Because the smart bowl can detect when food and/or water is placed in the bowl(s), the system can transmit the reminder again, if food or water are not placed in the bowl(s) within a predetermined period of time, for example 15 minutes. These reminders can continue to be transmitted until bowl(s) are filled to comply with the feeding schedule.

Figure 15:
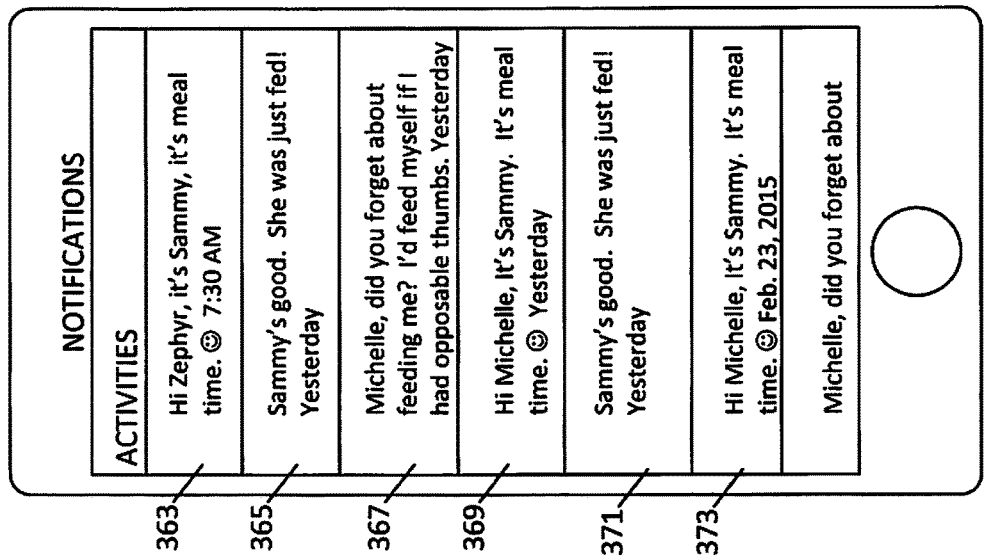

In other embodiments, the smart bowl system can provide additional feeding reminders to the pet caretaker and/or other system users. For example, in an embodiment a pet can have a primary caretaker and a secondary caretaker who may want to monitor the pet's feedings that follows the responsibility ladder mentioned in the pack social network. With reference to FIG. 15, the smart bowl system can change color to catch the caretaker's attention, transmit text messages or app alerts to the caretakers. In this example, the pet is Sammy and the caretakers are Zephyr and Michelle. In this example, the last text message 363 was at 7:30 AM to Zephyr informing him that Sammy needs to be fed. Zephyr can respond to this message by feeding Sammy. Zephyr does not have to do anything else besides feed Sammy for the entire social group to be informed seamlessly that Sammy has been fed (or hasn't).

In an embodiment, the smart bowl can be configured to have different caretakers feed Sammy. The smart bowl message from yesterday 365, 367, 369, 371 can be directed towards Michelle if she was the designated caretaker yesterday with copies of the text messages sent to both Zephyr and Michelle. The first message from yesterday 373 informs Michelle that Sammy needs to be fed. The second message from yesterday 371 is that Sammy is good and has been fed. The third text message from yesterday 369 can inform Michelle that Sammy needs to be fed which may be Sammy's second feeding for the day. The fourth message from yesterday 367 can be a reminder to Michelle that Sammy needs to be fed. The fifth message from yesterday 365 is that Sammy is good and has been fed. These messages can remind any caretaker to care for the pet and automatically provides information, schedule and instructions to them so that the pet will be properly cared for in the event that the primary caretaker is not available.

Figure 16:
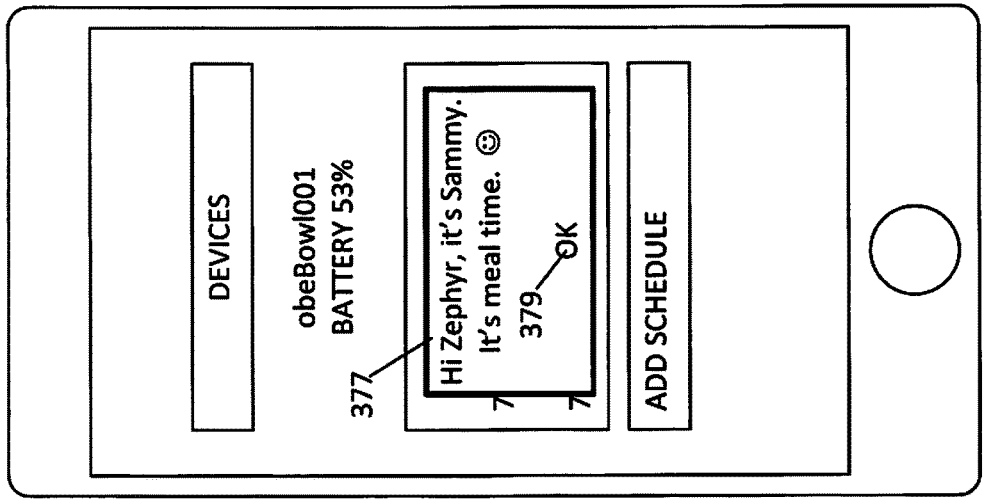
Figure 18:
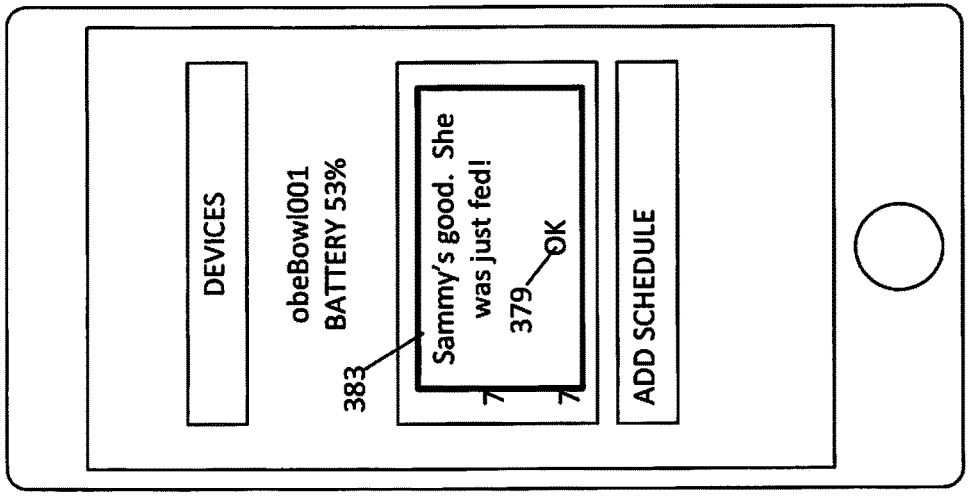
Figure 17:
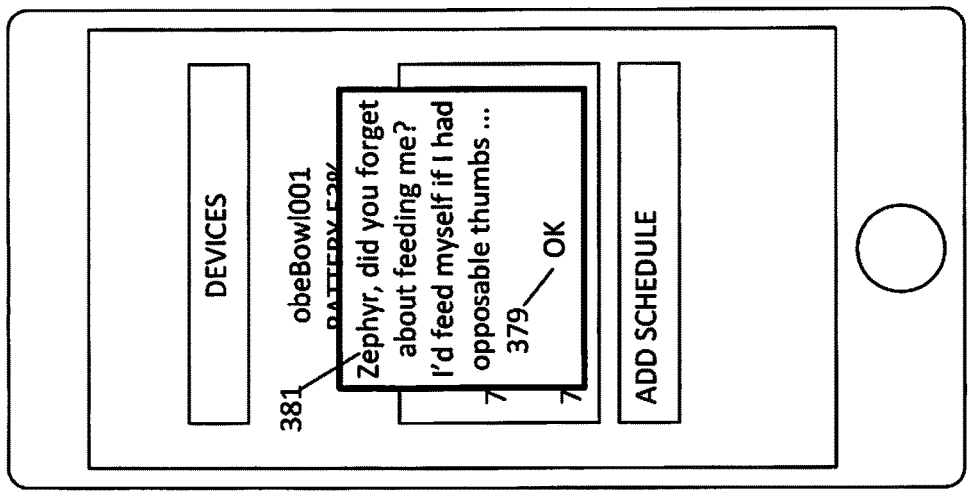

With reference to FIGS. 16-18, in other embodiments, the smart bowl system may cause a pop up message to be displayed on the computing devices of the caretakers Zephyr and Michelle. With reference to FIG. 16, a feeding reminder 377 to the caretaker Zephyr to feed the pet Sammy is displayed. The user can read the message and then click the OK button 379 to close the pop up message 377 window. In FIG. 17, a second feeding reminder 381 to Zephyr to feed the pet Sammy is displayed. The user can read the message and then click the OK button 379 to close the pop up message 377 window. After the second reminder Zephyr feeds Sammy and the smart bowl system can respond by transmitting a text message 383 stating that Sammy is good and that she was just fed.

Figure 19:
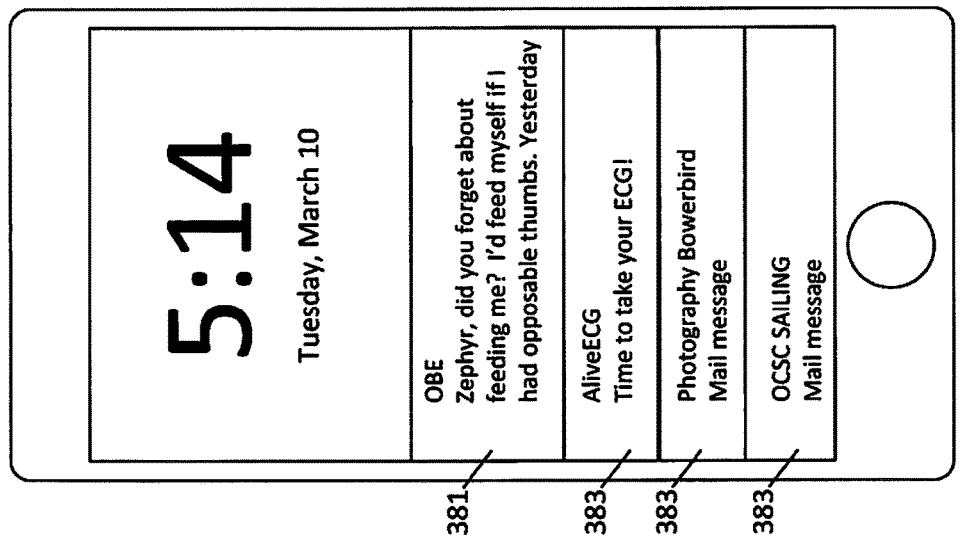

In yet another embodiment, the text messages from the smart bowl system can be transmitted and displayed mixed in with other mobile computing device messages. For example, with reference to FIG. 19, the feeding reminder message 381 can be displayed with other mobile computing device messages 383.

Figure 20:
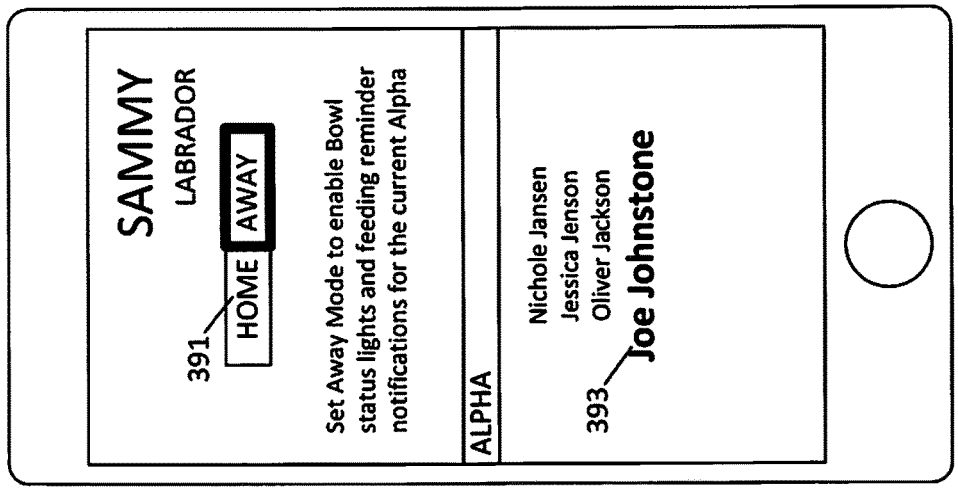
FIG. 20 illustrates an embodiment of a user interface that allows the user to adjust the caretakers who receive pet feeding notifications.

In an embodiment, the primary caretakers in the "home" configuration of the smart bowl system are Zephyr and Michelle as illustrated in FIGS. 15-19. With reference to FIG. 20, the smart pet bowl system can include a user interface that has a home and away button 391 that allow the pet's caretakers to be adjusted when the primary caretaker(s) are not at home. In the illustrated embodiment, the system user has selected the away setting on the home and away button 391. In the illustrated example, the user has selected Joe Johnstone 393 to receive the pet feeding reminders.

Figures 21, 22:
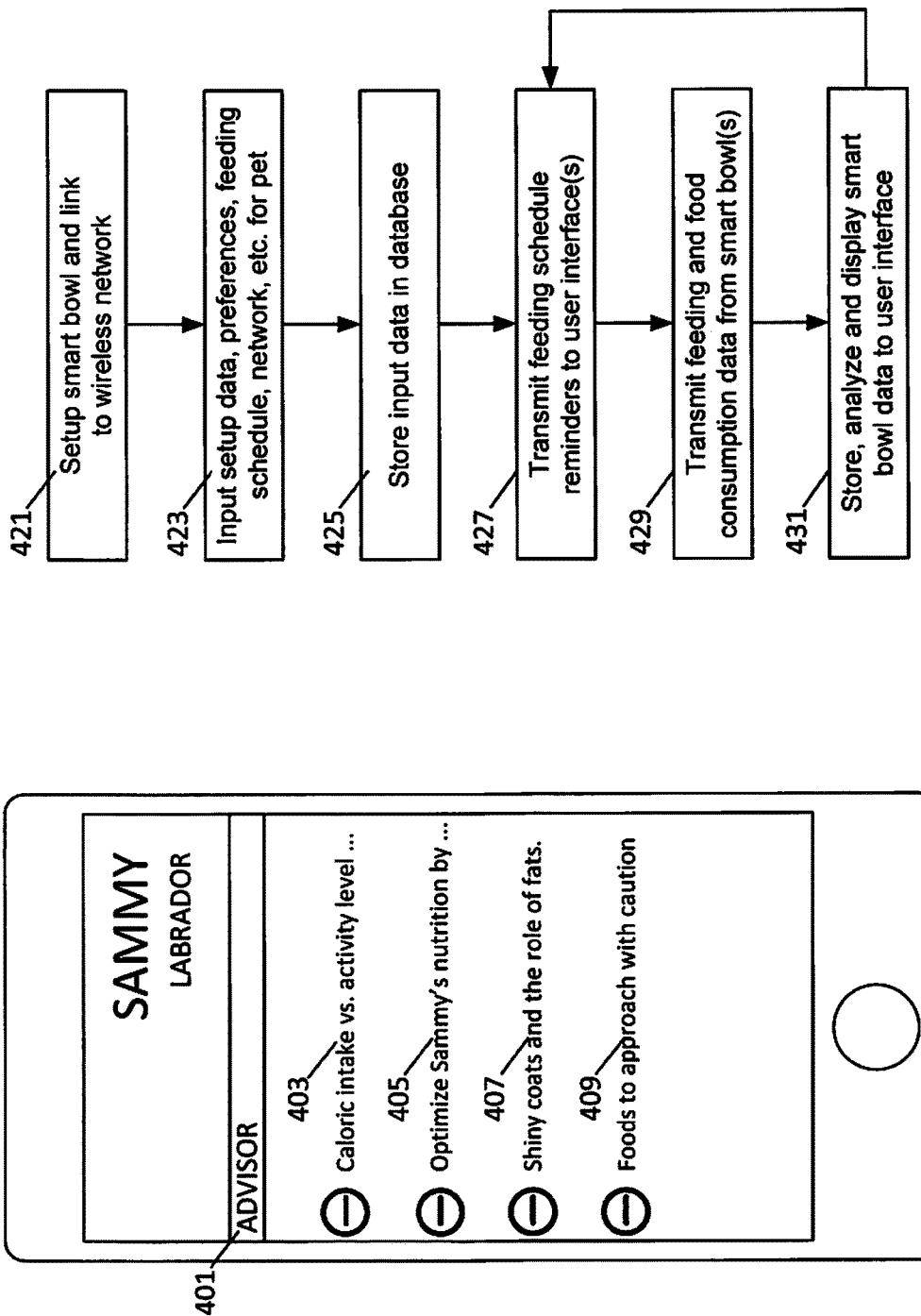
FIG. 21 illustrates an embodiment of a user interface that pet advice to system users.
FIG. 22 illustrates an embodiment of a flow chart for smart bowl setup and operation.

In addition to providing pet specific information based upon the information provided by user and pet interaction with the smart bowl, the user interface on the computing device may also provide general pet information. In an embodiment, pet care and health information can be stored in memory in the computing device and/or on the server. With reference to FIG. 21, the user interface can include an Advisor page 401. In this embodiment, the Advisor page 401 can include a menu of different topics including: Caloric intake vs. activity level 403, Optimize Sammy's nutrition 405, Shiny coats and the rule of fats 407 and Foods to approach with caution 409. The user can click on any of the displayed subjects to obtain more information on the selected topic. The Advisor information can be updated and added to the server and the server can provide updates to the Advisor user interface page, which can be accessed by all system users.

Figure 27:
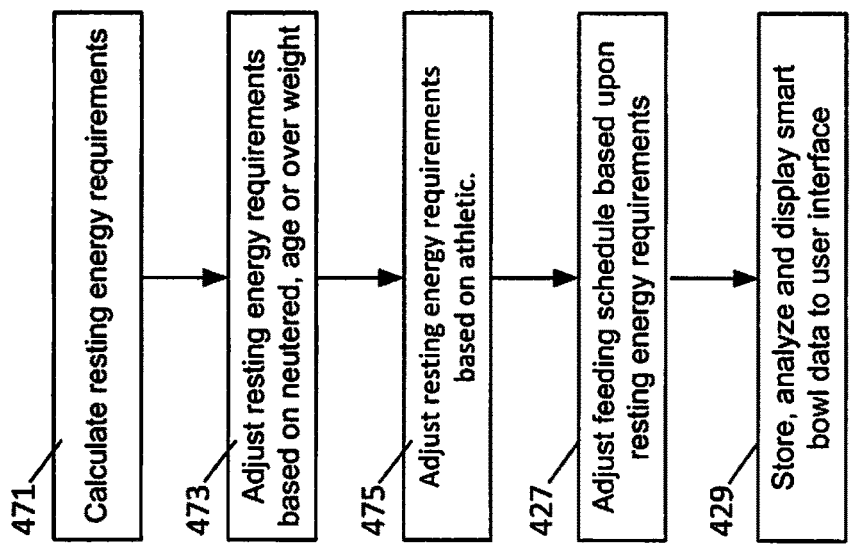
FIG. 27 illustrates a flowchart for the operation of a smart bowl.

As discussed above with reference to FIG. 1, in an embodiment, the server can include a database that stores information about the pet, the caretakers and the pet's feeding schedule. In an embodiment, the operation of the smart bowls can be represented by a flow chart as illustrated in FIG. 27. A setup procedure can be performed prior to using the smart bowl linking the smart bowl to a wireless network 421. In an embodiment, the smart bowl system can be setup and linked to the other system components through a WiFi wireless network. The smart bowl system can determine the strength of the wireless connection signals and output information regarding the connection status and the smart bowl battery charge. If the signal and/or battery are weak, the system can instruct the user to move the smart bowl and/or charge the batter. In some cases the smart bowl may need to be rebooted if there is an error in the network connection setup, the smart bowl system can inform the user if rebooting is necessary. Once the smart bowl is setup and connected to the wireless network, the setup data, preferences, feeding schedule, pack network information can be input through the user interface on the computing device for the pet 423. The setup data, preferences, feeding schedule, pack network information can then be stored in a smart bowl database 425.

The feeding schedule feeding schedule reminders can be transmitted to the caretaker(s) through user interfaces on the mobile computing devices 427. In an embodiment, the server can follow the feeding schedule data and transmit the feeding reminder messages to the designated caretaker's mobile phone numbers and/or email addresses to remind the caretaker(s) to feed the pet as described above. In response to the reminders, the caretaker can fill a first smart bowl with food and/or a second smart bowl with water as described above. The smart bowl(s) can detect the feedings as weight added to the smart bowl(s). The smart bowl(s) can then monitor the pet's consumption of food and water. More specifically, the smart bowl weighs and tracks each meal including: how much food and water did the dog get fed, what times was the dog fed, how much food did the pet eat, how fast did the eat, has the pet been fed yet, when was the pet last fed. The smart water bowl can similarly track the pet's water supply and consumption. For example, the smart water bowl can track and determine: when the pet last drank, how much the pet drank, how often the pet drinks over time, and when the bowl was last refilled. The smart water bowl can also inform the caretaker when water needs to be added, when water needs to be changed and/or refilled, how much water does the pet normally drink, etc. The smart bowl(s) can transmit the feeding and food consumption data to the server and mobile computing devices of the caretakers 429.

The feeding and consumption data can be stored in the server database and processed to convert the weight change information into added useful data. The processed data can be displayed on the mobile computing device(s) of the caretaker(s) 431. The steps of transmitting feeding schedule reminders 427, transmitting feeding and food consumption data 429, and storing, analyzing and displaying pet bowl data 431 can be repeated one or more times per day.

The smart bowl data can be stored in the database and this information can be analyzed and processed. For example, the change in weight detected by the smart bowl can be converted into other food metrics including: calories provided to the pet and consumed by the pet, volume of water provided and consumed by the pet, etc. In some embodiments, the smart bowl can further analyze the feeding patterns of the pet to determine additional information. For example, if there have there been any changes in the pets food consumption pattern. In an embodiment, the smart water bowl system an determine if there have there been any changes in the pet's normal food or water consumption patterns that can indicate medical or health issues. For example, if the pet has not eaten for an extended period of time, this can indicate possible illness or the health issues. In response to the detection of feeding anomalies, the smart bowl system can transmit warnings to the caretaker(s) indicating that there may be a health problem with the pet.

In different embodiments, the smart bowl system can be used with other components to perform additional features. For example, in many households a plurality of pets may share food from the same food bowl and water from the same water bowl. In order to distinguish the quantity of food consumed by each pet, the smart bowl system may a pet identity sensor 441 which can detect a radio frequency ID, a Bluetooth ID or other identification signals, which are emitted from tags 442 or other devices worn by the different pets sharing the same food and/or water bowls. With this identification information, the smart bowl can uniquely recognize and identify a pet when the pet is within a specified proximity threshold of the bowl or makes contact with the bowl. The pet identity sensor 441 on the bowl/base may recognize the pet by recognizing a ID signal from the ID device worn by the pet. With this information, the smart bowl system can determine which pet consumed a food and/or water and attribute the actual food consumption to each of the pets sharing the food bowl. The smart bowl system can then accurately determine the food consumption of each of the pets that share the smart bowl.

In other embodiments, various other sensors can be used to distinguish pets so that the food and water consumption can be properly attributed by the smart bowl system. In an embodiment, the smart bowl 101 may have a visual ID sensor 443 which can include a camera or other light sensor, which can distinguish the pets based upon visual information detected by the visual ID sensor 443 and stored in memory 207. The processor 201 and visual ID sensor 443 can be used to accurately distinguish different identifications when each of the pets have distinct features such as different size, shape or color. In some embodiments, the visual ID sensor 443 can be used to scan pet food information. For example, the caretaker may place a pet food bar code in front of the visual ID sensor 443 and from the bar code, the smart bowl 101 can identify the pet food that will be placed in the bowl 103. In other embodiments, the pet food package or can may place a pet food bar code in front of the visual ID sensor 443 and from the package or can image, the smart bowl 101 can identify the pet food that will be placed in the bowl 103.

In some embodiments, the proximity sensor 445, which can be an infrared (IR) sensor which detects body heat. Humans have a lower normal body temperature than pets such as dogs. The IR heat output by pets can vary depending upon the hair or fur thickness. Thus, a long hair/fur pet can be distinguished from a short hair/fur pet with an IR proximity sensor 445 and stored in memory 207. Again, the smart bowl 101 may be able to distinguish different pets based upon their distinct IR outputs and attribute feedings based upon these identifications.

In yet another embodiment, the smart bowl 101 may include a smell sensor 447 which may detect particles emitted from a pet's mouth. The smell sensor 447 can be calibrated to detect particles or quantities of particles that are distinct to each pet and which is stored in memory 207. These particles are detected by the smell sensor 447 when the pet is near the smart bowl 101. The processor 201 can identify the pet based upon the data from the smell sensor 447 and attribute feedings based upon these identifications.

In an embodiment, the smart bowl 101 may communicate with a touch sensor 449 which can be placed adjacent to the smart bowl 101. When the pet eats from the smart bowl 101, the pet will place a paw on the touch sensor 449. Each pet can have a distinct paw print which is stored in memory 207 and the processor 201 can be configured to distinguish the different pets based upon the paw signals from the touch sensor 449. The processor 201 can attribute feedings based upon these identifications.

In an embodiment, the smart bowl 101 can communicate with a weight sensor 451. Each of the pets may have a different weight, which is stored in the memory 207. When the pet feeds, the weight can be measured with the weight sensor 451 and the processor 201 can distinguish the different pets based upon the detected weight. The processor 201 can attribute feedings based upon these identifications.

In addition to attributing feedings with specific pets, the identification of the pets be used to control the time and quantity of food consumed by each pet. Based on the pet's feeding schedule and pet identification, the smart bowl 101 may prevent that pet from eating or drinking from that bowl through various means. With reference to FIGS. 24 and 25, in an embodiment, the smart bowl 101 can be placed within a housing 461 which can include a movable cover, flap or door 463 coupled to a lockable mechanism 464. If the smart bowl 101 is used with a single pet, the system can control the amount of food consumed in a predetermined period of time. For example, the lockable mechanism 464 can allow the door 463 to move and allow feeding in accordance to the feeding schedule. If the pet consumes more food than allowed, the pet bowl 101 can lock the lockable mechanism 464 to prevent further feeding until the feeding schedule allows additional feeding. The system can therefore control the amount of food consumed by the pet throughout the day.

If multiple pets are associated with the same smart bowl, the smart bowl 101 may discriminate between the different pets based on detecting the pets' identities and prevent some of the pets from feeding if they have exceeded their daily feeding allotment. The ID sensor can identify the individual pets. If the identified pet is allowed to eat more food according to the pet feeding schedule, the lockable mechanism 464 can be released to allow the door 463 to open and the pet to eat. However, if the identified pet is not allowed to eat more food according to the pet feeding schedule, the lockable mechanism 464 can be locked to prevent the door 463 from opening open and prevent the pet from eating.

With reference to FIG. 26, in an embodiment, the smart bowl 101 may be coupled to a feeding mechanism, which can be used to store, and release pet food into the bowl 103. In this embodiment, the feeding mechanism 470 may include a food storage container 471, which stores a supply of pet food and a valve 473. In this configuration, the smart bowl 101 can be configured to transmit feeding signals to the feeding mechanism 470. At the designed feeding times as set by the pet's feeding schedule, the smart bowl 101 can transmit a signal to the valve 473 which can open to release food into the bowl 103. As the food released from the storage container 471 to the bowl 103, the weight of the pet food in the bowl 103 is detected. When the scheduled weight of pet food has been released, the smart bowl 101 can transmit a signal to the valve 473 to close so that no more food is placed in the bowl 103. The feeding mechanism 473 can communicate with the caretaker through the smart bowl 101 and provide notices including: running low on food, ran out of food, valve malfunction, etc.

As discussed, the user can configure the smart bowl system to output reminder messages as a user desires. For example, in an embodiment, the system can have a caretaker hierarchy management. Depending on the communication preferences set based on a caretaker status, like caretaker home or away, the smart bowl can be configured to communicate through different signals. In a normal at home mode, the communication can be performed with light signals. At the base 105 of the smart bowl 101, a light ring surrounding the base 105 can illuminate a color through the translucent base 105. In addition to the light signals, additional output signals emitted by the smart bowl 101 may include sound, vibration, different light colors, different light patterns such as rapid blink, slow blink, dot/dash patterns, etc. In some embodiments, the light output of the smart bowl 101 may be able to display: numbers, icons, text, characters, etc. The default settings are set for caretaker home or away. Users may create any predefined status based on the caretaker's preferences or location. For example, a caretaker can configure the smart bowl status to change from home to away when the caretaker phone is more than a predetermined distance away from the smart bowl. In an embodiment, the smart bowl system can monitor the GPS coordinates of the smart phone computing device of the caretaker. The smart bowl can be configured to be switch from home to away when the caretaker is a user specified distance from the bowl, for example 15 miles away. In an embodiment, these settings are rules based on what a user wants. In another configuration example, a user may choose to get a text every time the dog takes a drink or get an app alert when the dog starts eating. The status is set at the cloud level and stored in the smart bowl's memory.

In an embodiment, the smart bowl system can share information with a pet activity tracker and adjust the meal servings based upon the activity level of the pet. The smart bowl can determine if the pet has been overfed or underfed compared to the pet's feeding schedule and activity level. In an embodiment, the feeding calories adjustments based upon activity level can be saved as rules or algorithms in the memory of the server and/or computing device.

As discussed, the user can setup the feeding schedule through the user interface as described above with reference to FIG. 5. In some embodiments, the smart bowl system may be able to recommend a feeding quantity for the scheduled feedings for the pet based upon the pet data. In an embodiment, the smart bowl system may calculate the resting energy requirements for the pet based upon the weight of the pet. In the following example the food requirements are calculated for dogs. In other embodiments, different algorithms can be used for cats and other types of pets.

Resting Energy Requirements (RER kcal/day)=70× body weight(BW kg)$^{0.75}$

Once the RER for a dog is calculated, adjustments to the RER can be made. For example, if any of the following conditions apply to the dog then the RER can be reduced by 20%, 1) dog has been neutered, 2) dog is 8 or more years old and weights 5-60 lbs, 3) dog 5 or more years old and weights 61 or more pounds, 4) dog has a body condition score (BCS) greater than 5. The BCS score is determined based upon the dog's characteristics in table 2 below.

TABLE 2

| BCS | Status | Physical Characteristics |
|---|---|---|
| 1 | Too thin | Ribs, lumbar vertebrae, pelvic bones and all bony prominences evident from a distance. No discernible body fat. Obvious loss of muscle mass. |
| 2 | Too thin | Ribs, lumbar vertebrae and pelvic bones easily visible. No palpable fat. Some evidence of other bony prominence. Minimal loss of muscle mass. |
| 3 | Too thin | Ribs easily palpated and may be visible with no palpable fat. Tops of lumbar vertebrae visible. Pelvic bones becoming prominent. Obvious waist and abdominal tuck. |
| 4 | Ideal | Ribs easily palpable with minimal fat covering. Waist easily noted, viewed from above. Abdominal tuck evident. |
| 5 | Ideal | Ribs palpable without excess fat covering. Waist Observed behind ribs when viewed from above. Abdomen tucked up when viewed from side. |
| 6 | Too heavy | Ribs palpable with slight excess fat covering. Waist is discernible viewed from above but not prominent. Abdominal tuck apparent. |
| 7 | Too heavy | Ribs palpable with difficulty; heavy fat cover. Noticeable fat deposits over lumbar area and base of tail. Waist absent or barely visible. Abdominal tuck may be present. |
| 8 | Too heavy | Ribs not palpable under very heavy fat cover, or palpable only with significant pressure. Heavy fat deposits over lumbar area and base of tail. Waist absent. No abdominal tuck. Obvious abdominal distention may be present. |
| 9 | Too heavy | Massive fat deposits over thorax, spine and base of tail. Waist and abdominal tuck absent. Fat deposits on neck and limbs. Obvious abdominal distention. |

If a dog is: a senior, neutered, or overweight and meets any of these listed conditions, the RER can be reduced. In an embodiment if a dog meets one or more of the listed conditions, the RER can be reduced by 20%. Conversely, if a dog is athletic and active and does not meet any of the RER reduction requirements, then the RER can be increased by 20%.

As an example, the feeding schedule recommendation for a 5 year old dog that weighs 63 lbs (28.64 kg) and has a body with: slight fat covering his ribs, a waist observed behind ribs when viewed from above and an abdomen tucked up when viewed from side, the smart bowl can make a feeding recommendation based upon this information. For example, the RER=$70 \times 28.64^{0.75}$=866.5 calories. Since the dog is 5 years old and weights more than 61 pounds and has a body condition (BCS) score of 6 which is greater than 5, the RER is reduced by 20%. The total daily calories are: 866.5−0.2× 866.5=693 calories per day. The smart bowl system can know that the pet food brand and type input to the system by the caretaker can be 1.32 calories per gram. From this information, the smart bowl system can calculate that the dialing feeding is equal to 693 calories per day/1.32 calories per gram=525 grams of pet food per day. The caretaker may have also input the desire to feed the dog equal sized feedings twice a day, breakfast and dinner. The smart bowl system can then determine that each feeding should be 525 grams per day/2 feedings per day=262.5 grams of food per serving.

The described feeding algorithm can be adjusted based upon various other factors, which can be related to the pet's health. The algorithm may also be adjusted based upon historical data collected for the pet and other pets by the server. For example, the smart bowl system may collect the food consumption rate of the pet. A fast food consumption rate can indicate that the pet is hungry and possibly under-fed. In contrast, a slow or only partial food consumption rate may indicate that the pet is full and being over fed or that the pet is sick. The feeding algorithm may also be adjusted for the activity of the pet. A high level of activity can indicate a healthy pet, which may also require more food while lower than normal activity can indicate a health problem with the pet. As discussed, the smart bowl system can be used with pet identifiers to accurately identify the feeding, food consumption and activity levels of each pet in a household.

In many cases the pet's digestive characteristics can be predicted based upon the pet's genetics (DNA), nutrient profile, metabolism, medication being taken, age, breed, ambient temperature, altitude, date, time, and other possible factors. The normal metabolism of the pet can be related to the genetics and breed of the pet. For example, large breed puppies such as Golden Retrievers can develop serious joint disease if fed a diet that is too high in calories or calcium. It is critical that Golden Retriever puppies grow up eating an appropriate diet so their bones develop properly. In contrast Dachshund breed dogs may require a diet that promotes a lean body mass, which can prevent back injuries, which can be common because of this breed's elongated body. In an embodiment, the UI of the smart bowl app can have an input for the breed of the pet. Many dogs are not pure breeds so the UI may have a provision for inputting multiple breeds based upon the DNA analysis or the known breed mixture. For example, the UI may allow the user to input a mixed breed such as 50% Jack Russell Terrier and 50% Italian Greyhound. The smart bowl system may have a breed database, which includes metabolism or RER adjustment data for different breeds of pets. The smart bowl system can calculate an RER correction factor based upon mixed breed pets based upon an algorithm or interpolation process. For example, a Jack Russell Terrier may have a 0.1×RER correction factor and an Italian Greyhound may have a 0.04×RER correction factor. With a 50% mix, the breed correction factor can be (0.10×0.50)+(0.40×0.50)=0.70.

Different pets can have different nutrient profiles based upon the breed and medical condition of the pet. In an embodiment, the nutritional profile for different breeds can be stored in the smart bowl server database. In other embodiments, the nutritional provide can be adjusted based upon the pet's medical condition. For example, a diabetic pet may need to be placed on a diet that is high-fiber and low fat. The pet may also need to be fed small portions of food several times per day to keep the pet's insulin levels as close to normal as possible throughout the day.

In some embodiments, the pet's medication can be input through the smart bowl app UI. The smart bowl system can respond by adjusting the feeding schedule based upon the requirements of the pet's medication. The medication schedule can also be stored in the feeding schedule in the server database. The medication reminders can be included in the feeding reminders. In some embodiments, the recommended feedings calculated by the feeding algorithm can be adjusted based upon the ambient temperature. The pet may store more fat on the body in response to lower temperatures and store less body fat in response to higher ambient temperatures. Thus, it may be necessary to a lower caloric intake when the ambient temperature is lower and conversely increase the caloric intake if the stored body fat becomes too low in higher ambient temperature environments. In an embodiment, the smart bowl system can detect the ambient temperature and adjust the recommended feeding RER adjustment accordingly. In some areas, the ambient temperature fluctuates based upon the seasons. In an embodiment, the smart bowl system may determine the season and the average ambient temperature based upon historical data and/or measured data and make adjustments accordingly. More specifically, the smart bowl system may feed the pet less pet food in the colder winter and more pet food in the warmer summer months.

In another embodiment, the caloric intake of the pet can be adjusted based upon the altitude. In an embodiment, the bowl sensor of the smart bowl base can include a pressure sensor, which can detect the estimated altitude or a UPS unit, which can detect the altitude. Humans who live in high altitude communities are less likely to be overweight than those living at sea level. Thus, there can be a relationship between altitude and caloric intake. Because most pets live at or near sea level, the smart bowl system may adjust the feeding volume when the pet is at higher altitudes such as 3,000 feet or more. In an embodiment, the smart bowl system can adjust the recommended feeding by increasing the feedings in proportion to the altitude of the pet.

The pet feeding information including RERs and RER adjustments can be stored in the memory with the feeding schedule in the memory of the smart bowl, in the server memory and possibly on the computing device. When the feeding messages are sent to the caretaker, food can be placed in the smart bowl, which can signal more food needs to be placed in the bowl until 262.5 grams have been detected by the weight sensor. The smart bowl can signal the caretaker to stop placing food in the bowl after the recommended quantity has been served to the dog. The pet can then consume the pet food and the described reminder and feeding process can be repeated for the subsequent feedings.

In other embodiments, other algorithms can be used to alter the RER values to determine the daily caloric intake for a pet. For example, Table 3 lists the Estimated Total Daily Energy Needs (ETDEN) correction factors based upon the physical condition of the dog. The ETDEN correction factors can be based upon various conditions of the dog. From the RER and the physical characteristics of the dog, the smart bowl system can determine the dog's ETDEN and then the recommended feedings based upon the caretaker's feeding preferences.

TABLE 3

| Condition | Estimated Total Daily Energy Needs |
| --- | --- |
| Neutered adult | = 1.6 × RER |
| Intact adult | = 1.8 × RER |
| Inactive/obese prone | = 1.2-1.4 × RER |
| Needs weight loss | = 1.0 × RER for ideal weight |
| Needs weight gain | = 1.2-1.8 × RER for ideal weight |
| Active, working dogs | = 2.0-5.0 × RER |
| Puppy 0-4 months | = 3.0 × RER |
| Puppy 4 months to adult | = 2.0 × RER |

The feeding calculations for a 10 kg neutered adult dog are described. The dog's can be input through the user interface of the app running on the computing device. The app can calculate the RER as $70 \times (10)^{0.75} = 394$ calories/day. The dog is a normal weight adult and the most accurate listed condition that the dog meets is that he is a neutered adult. The ETDEN can be calculated based upon the neutered adult condition of the dog as: 1.6×294 calories/day=470 Calories/day. The smart bowl system can know that the pet food brand and type input to the system by the caretaker can be 1.32 calories per gram. From this information, the smart bowl system can calculate that the ETDEN is equal to 356 grams of pet food per day. The caretaker may have also input the desire to feed the dog equal sized feedings twice a day, breakfast and dinner. The smart bowl system can then determine that each feeding should be 178 grams of food and this information can be stored in the memory with the feeding schedule on the memory in the smart bowl, in the server memory and possibly on the computing device. When the feeding messages are sent to the caretaker, food can be placed in the smart bowl, which can signal more food needs to be placed in the bowl until 178 grams have been detected by the weight sensor. The smart bowl can signal the caretaker to stop placing food in the bowl after the recommended quantity has been served to the dog. The pet can then consume the pet food and the described reminder and feeding process can be repeated for the subsequent feedings.

In an embodiment, the suggested feeding values can be changed over time to adapt to the needs of the pet to maintain a healthy weight. For example, with reference to FIG. 23, in an embodiment the smart bowl system 101 can be used with a weight sensor 451. The weight sensor 451 can track the dogs weight over time with weight data from the weight sensor 451 being stored in the memory 207. In an embodiment, an "ideal weight" range can be stored in memory 207 and the ETDEN can be adjusted based upon changes in weight over time. If the dog's weight remains within the ideal weight range, the ETDEN will remain constant. However, if the weight of the dog decreases, the smart bowl 101 can adjust the feeding to increase the ETDEN so that the dog is feed more food to regain weight until the dog is back within the ideal weight range. Conversely, if the dog's weight increases above the ideal weight range, the ETDEN will decrease so that the dog is fed less food until the dog's weight returns to the ideal weight range. In an embodiment, the change in ETDEN can be proportional to the deviation from the ideal weight range. For example, if a dog is 10% over the ideal weight range, the ETDEN can be reduced by 10%. This system can account for variations in the pet's feeding and exercise activities. For example, if a pet has been feed treats or snacks, which were not part of the stored feedings schedule, the weight sensor may detect the consumption of this extra food and make a correction in the subsequent scheduled feedings. Similarly, if the dog has been more active than normal and has lost weight as a result of this activity, the smart bowl can increase the ETDEN to account for this added activity.

In another embodiment, the ETDEN can be adjusted based upon the pet's body mass index (BMI). The caretaker may input the breed of the dog, gender, the height from the ground to the dog's shoulder and weight. The BMI can be calculated as: BMI=weight in kg/(height in meters). The ideal BMI range can be stored for each breed and gender of dog. If the BMI is above the ideal BMI range, the ETDEN can be reduced so that less food is fed to the pet. Conversely, if the BMI is below the ideal BMI range, the ETDEN can be increased and more food can be fed to the pet. For example, an ideal BMI range for a male and female Italian Greyhound can be 29-31. If the BMI is greater than 31 the ETDEN can be reduced and if the BMI is lower than 29, the ETDEN can be increased until the BMI is measured to be within the ideal range. It can be difficult for caretakers to visualize the excess and unhealthy weight that the pet may be carrying. In an embodiment, the user interface of the caretaker's computing device can display images, which can be illustrations, silhouettes, photographs, or other images of a human with a corresponding BMI that matches the pet's BMI. This can help a caretaker to more accurately understand and interpret the pet's BMI values.

In another embodiment, the smart bowl system 101 may communicate with a pet activity sensor 453 which may include a system for detecting a pet's activity level through a global positioning system (GPS) sensor and/or accelerometers. The pet activity sensor 453 may also calculate the pet's exercise level. In an embodiment, the pet's activity level can be transmitted from the activity sensor 453 to the pet ID sensor that can associate the pet's activity readings with the pet's identification. The processor 201 can then adjust the ETDEN based upon the pet's activity. If the dog exercised more than normal, the ETDEN can be adjusted to increase the food provided at the next feeding. The increase in food can be proportional to the added activity level. For example, a 20% increase in activity over normal can result in a 5% increase in the ETDEN for the next feeding.

The smart bowl system can also monitor the hydration levels of the pets. The hydration can be based upon the ambient temperature and humidity as well as the activity level of the pet. The smart bowl system can detect the drinking rate of the pet and notify the caretaker when the pet is consuming higher than normal rates of water, which may indicate dehydration. The smart bowl system can also compare the pet's water consumption to that of other pets of similar breeds and environments, which can be stored in a database of water consumption. In some embodiments, the database may include drinking data for pets that are sick and may have kidney illnesses. For example, dehydration can lead to kidney failure and detecting drinking patterns, which match those of pets who have had kidney failure can be critical information in prevention. If abnormal drinking behavior, which may indicate a health issue is detected, the smart bowl system can transmit a warning message to the UI of the caretaker's computing device.

In some embodiments, the smart bowl 101 may also communicate with other WiFi devices in a home network such as smoke alarms and thermostats, which can communicate with computing devices such as smart phones. In an embodiment, the smart bowl may turn off/or on or modify its behavior based on any other smart device in the home, for example, a smart thermostat, smart fire alarm or a smart home hub. If the hub or thermostat settings are changed to away, the dog bowl may be triggered to set alarms and reminders. The smart bowl system may assume that the dog is at home and someone else is taking care of him and ask for a caretaker confirmation through the app on the care taker's smart phone computing device. The caretaker can then confirm or inform the smart bowl that the dog is with the family. The smart bowl can adjust the settings based upon the confirmed location of the pet. The smart bowl can also adjust its functionality based on smoke alarm status or smart-thermostat. For example, in response to a fire, the smart bowl may receive the fire signal from the smoke alarm and respond by emitting a siren sound and broadcasting a pet notification message such as "dog inside" or "cat inside". These notifications can be useful to alert firemen to aid in rescuing the dog.

In an embodiment, the pet's feeding and other information such as water consumption, weight and activity can be stored in the smart bowl, server and/or computing device memory. This data can be transmitted to a data platform for veterinarians. For example, the smart bowl system can send real time and trended information to veterinarian on consumption habits. With this information the veterinarian can work with owner to put pet on diet regimen and monitor the pet's nutrition and health. Based on the pet's behavior and owners feeding preferences, the veterinarian can recommend feeding or diet regimen to help a pet lose weight and/or to increase the pet's water intake.

In addition this information can be shared with pet food companies. As discussed, the specific pet food being used with the smart bowl is known and this smart bowl stored information can be shared with the pet food companies so that they can better understand detailed feeding behavior of customers. By knowing the existing consumers, the food companies can market to targeted, specific demographics of the customers.

Figure 23:
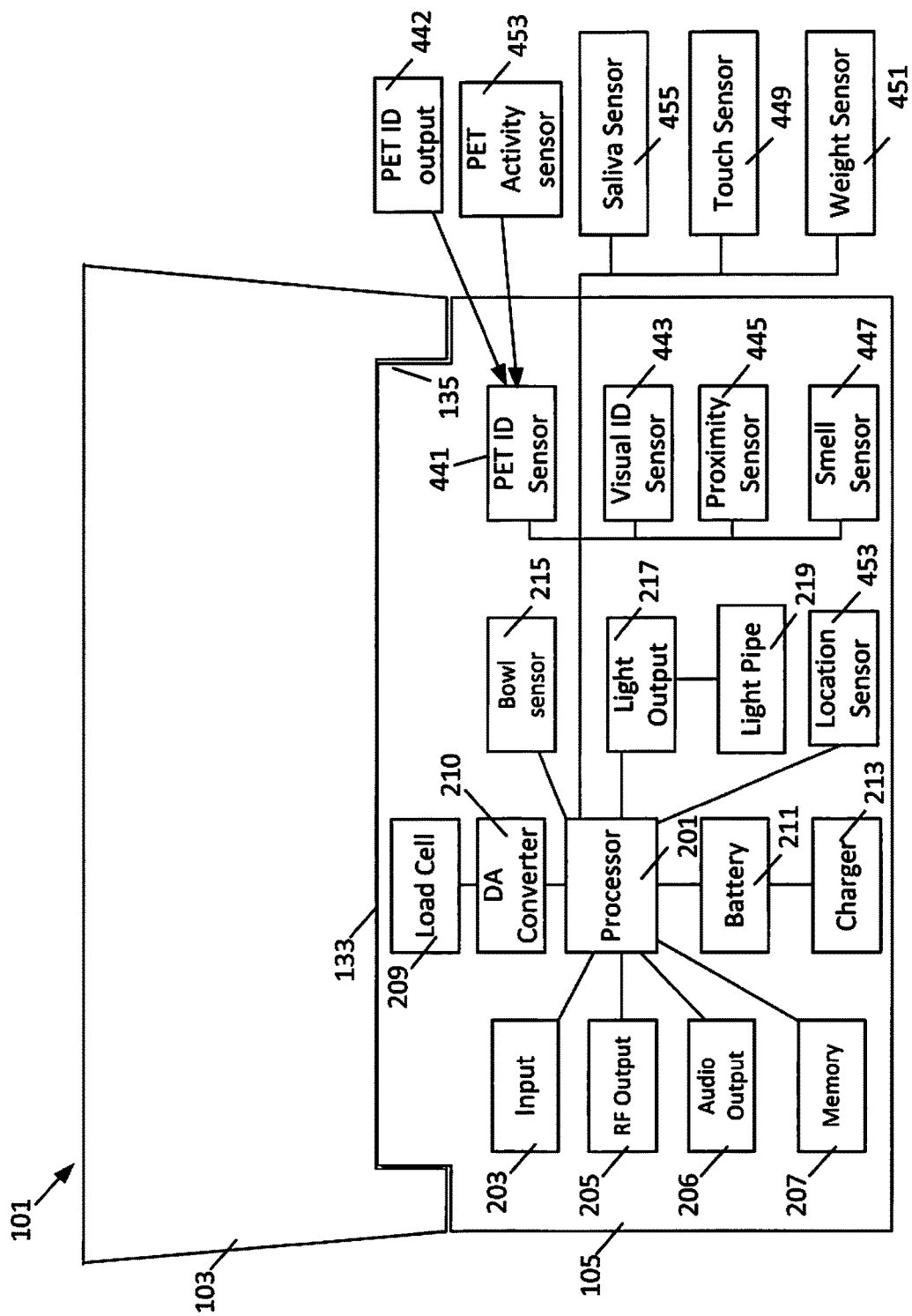
FIG. 23 illustrates a block diagram of an embodiment of a smart bowl.

With reference to FIG. 23, in an embodiment, the smart bowl 101 can communicate with a saliva sensor 455. The saliva sensor 455 can be mounted in the water bowl or as a separate structure that is licked by the pet resulting in saliva being left on the saliva sensor 455. In an embodiment, the output of the saliva sensor 455 can be used by the smart bowl 101 to detect level of hydration of the pet based upon the chemical make up of the saliva. In an embodiment, the smart bowl system 101 can transmit a warning message to the computing device of the caretaker if dehydration of the pet is detected. In an embodiment the saliva sensor 455 can detect bacteria and parasites in the pet's saliva. For example, bacteria such as pastuerella may inhabitant of the mouth in cats and dogs which can cause skin, lymph node and, sometimes, more severe infections. *Bartonella henselae* is a bacterium that is transmitted to cats from fleas is also housed in the cats' mouths. If these types of bacteria or parasites are detected in the saliva by the saliva sensor 455, the smart bowl can inform the user that the caretaker the pet may need veterinary care to kill these bacteria. The stored information can be forwarded to the veterinarian so that the proper treatment can be prescribed for the pet. For example, the DNA sample data can also be used to identify health risk factors for this animal and recommend care, diet, exercise and medications. In some embodiments, the saliva can be used for DNA sample data, which can be used to determine the origins or breed of the pet.

In some implementations, behavioral patterns, preferences (e.g., notification and reminder settings), nature of interactions with the smart bowl system, or other observed attributes of human users (caretakers of a pack) or pets may be monitored over a duration of time to build a learned model for individual human users and/or their pets. Features of the learned model with respect to the user or pet can then be used to modify configuration, settings, and rules of the smart bowl system in association with that given user or pet. For example, the smart bowl may observe the timing of the scheduled feedings, waterings, medication dispensing, and additional neurtraceuticals from the primary and secondary caretaker preference input data. The smart bowl system can then determine if there are any problems with this scheduling. In some embodiments, the smart bowl may observer pet behavior that may indicate there may be a problem with the feeding schedule. For example, the smart bowl may detect the pet licking or touching the empty bowl, which may indicate that the pet is hungry but unable to eat. The smart bowl may record these observations and report these behaviors to the caretaker(s).

In an embodiment, the smart bowl system can monitor and record the pet feedings and food consumption and other pet behavior and/or detected physical characteristics of the pet. The smart bowl system can analyze the pet's behavior and physical characteristics and determine if there is any abnormal data that may indicate a health problem with the pet. This analysis can be based upon various different comparisons including: comparisons to normal pet behavior and comparisons to data from other pets that are the same or similar breed, age weight and possibly gender. The smart bowl may detect a problem if the pet did not eat some or all of the food that has been placed in the food bowl within several hours more than normal. For example, the smart bowl may know based upon the pet's past feeding history that the pet normally consumes 400 grams of pet food within 2 hours of the food being placed in the smart bowl. The pet's feeding patterns can be stored in the memory of the pet bowl, the server and/or the computing device. The smart bowl system may respond to this eating anomaly by transmitting a message to the caretaker's smart phone computing device so that the caretaker will know that there may be a problem and the pet can be examined possibly be a veterinarian.

In other embodiments, the smart bowl system server can record the feeding and food consumption patterns of many pets in different homes and locations that are using all using the smart bowl system. The smart bowl system server can analyze, group and compare the feeding and eating patterns of many different pets. The server may group the pet feeding and eating data based upon the types of pets, the ages of the pets, the genders of the pets, the weights of the pets and the physical conditions of the pets. Based upon this information, the server may be able to identify normal ranges of food consumption and behavior and normal ranges of physical conditions. In an embodiment, the smart bowl server can compare an individual pet's feeding behavior to normal data ranges derived from many similar pets. The smart bowl system may respond to any detected anomalies by transmitting a message to the caretaker's smart phone computing device so that the caretaker will know that there may be a problem and the pet can be examined possibly be a veterinarian.

In addition to informing the caretaker of abnormal physical characteristics and behaviors, the smart bowl system can make recommendations on how to respond to the detected abnormal conditions. The smart bowl system may also allow users to access general information on pet health care. This feature of the smart bowl system can be known as the smart bowl advisor. For example, the caretaker may be interested in the pet health topic of a raw food diet. The caretaker may input "raw food" into a search menu of the smart bowl advisor database. The smart bowl system can respond to this inquiry by displaying information about raw food diets.

In an embodiment, the pet bowl system may detect changes in the pet's behavior or abnormal feeding behavior. For example, the smart bowl system may detect that the pet has not consumed the normal volume of water. The smart bowl system may inform the caretaker that the pet has not consumed a sufficient volume of water compared to the pet's normal behavior and the cumulative data from many other similar pets. The smart bowl system may suggest ways to encourage the pet to drink more water such as: adding ice cubes to the water, adding broth to flavor the water, adding water to the dry pet food, etc. Hopefully the recommended suggestions from the smart bowl system will correct the pet's lack of water consumption. However, if the pet continues to not drinking enough water, the smart bowl system will detect this and recommend that the caretaker bring the pet to a veterinarian.

As discussed above with reference to FIG. 23, the smart bowl system can include or be in communication with various different sensors, which can detect various different physical characteristics of the pet. In an embodiment, the smart bowl system server may compile information for many different pets and store this information in a database and compare the behavior and physical condition of each pet to the "normal" data for the pet as well as the cumulative "normal" data from many pets. When abnormal data is detected, the smart pet bowl system can transmit messages to the caretaker's computing device smart phone informing the caretaker of the detected data. For example, if contamination is detected, the smart bowl system can instruct the caretaker to remove the food and/or water from the smart bowl and cause the smart bowl to emit an alarm, which may prevent the pet from consuming the contaminated food. If the activity level is substantially lower than normal, the smart pet bowl may instruct the caretaker to check the physical condition of the pet for illness or injury. In some cases, a combination of data may indicate a more specific diagnosis.

In some embodiments, the smart bowl can be configured to identify or be informed of certain physical conditions and then adjust the feedings based upon these conditions. For example if a pet is pregnant the system can be adjusted to provide more food so that the pet has sufficient caloric intake based upon the progress of the pregnancy. The caretaker may inform the smart bowl system of the pet pregnancy. The advisor can identify a recommended feeding program for this physical condition. The caretaker will then have the option of accepting, modifying or rejecting the recommended feeding program. If the caretaker accepts the smart bowl feeding recommendations a revised feeding schedule for the pet can be applied for the duration of the pregnancy. The user may be able to input status updates for the pet pregnancy and the smart bowl system can continue to adjust the feeding schedule. Once the pet has given birth, the feeding schedule may continue to provide more food than normal as the pet nurses her babies. Once the babies are no longer nursing, the smart bowl system may return to a normal feeding schedule. The system may continue to receive information from other sensors and compare this data to normal or larger subject data that has been collected by the smart bowl server throughout these special physical condition situations. However, because weight gain is normal and necessary during pregnancy, the smart bowl system can track and maintain a proper feeding program that corresponds to the healthy weight requirements of the pet.

In other embodiments, the smart bowl system feeding schedule can be adapted for other physical conditions. For example, if a pet breaks a leg, the activity level can be reduced while the leg heals. A caretaker can input the type of injury and expected recovery time. The smart bowl feeding schedule can be adjusted to reduce the calories of food provided during the recovery time. As the pet heals and becomes more active the calories per feeding can be increased and may be brought back to a normal schedule once the pet has fully recovered and resumes a normal activity level. In an embodiment, the activity level can be monitored and recorded by activity trackers. For food and water and other information can be used by the smart bowl advisor to automatically recommend a modified caloric feeding schedule if necessary. The server may also 'push notifications' to the bowl to help alert caretakers. For example, in the event of a dog food recall, a push notification "Red Alert" may be activated to help prevent the dog from being fed that food.

In an embodiment, the smart bowl advisor can provide a health assessment of the pet based upon several variables including: DNA, nutrient profile, metabolism, medication being taken, age, breed, ambient temperature, altitude, date and time. As the smart bowl is used with the pet, this pet information can be stored and monitored over time. The health assessment can indicate if the pet is maintaining proper health metrics, becoming healthier or if the pet is becoming unhealthy for any reason. In response to health degradation, the smart bowl can make recommendations to the care taker for correcting these problems through the advisor section of the UI.

Table 4 below lists the possible information that can be detected and recorded by the smart bowl system.

TABLE 4

|  | Caretaker preferences | Caretaker hierarchy | Pet behavior |
| --- | --- | --- | --- |
| Schedule-feeding, watering, medication dispense, additional neutraceutical | Feeding time, daily, weekly monthly and variance | Who the backup caretakers are based on each situation | Observation if pet licks, touches bowl, logged |
| Comparison of this day, week, month year to last | Reminders of upcoming events or proactive messaging | Reminders of upcoming events or proactive messaging | |
| Comparison to other dogs same age, breed size | | | Learn how pet varies compared to the common sample |
| Who the caretaker is and corresponding settings | x | x | |
| GeoFence rules | If at home x, if at the gym y, if out of the country z | Based on geo changes - corresponding hierarchy i.e. If in kennel then feed three times a day | |
| | Update of contacts and numbers or pack relative to location - if in Georgia, then the emergency vet is 404 | Update of hierarchy | |
| Caloric consumption and nutrition | | | Increased activity, weight or as the dog ages update recommendations for nutrition and caloric content |
| Hydration | | | Increased activity, change in health, weight or as the dog ages update recommendations for hydration |

The smart bowl system can include a caretaker advisor that can be accessed by the caretakers through the user interfaces on the caretaker computing devices such as smart phones. The caretaker advisor can provide various types, classes of recommendations including pet care and health guidance and information through text articles, video recordings, interactive caretaker questionnaires stored in the server database and/or caretaker computing device memory. The smart bowl advisor can be used by pet owners to obtain guidance for pet care over the life of the pet. The information from web resources, academic articles and archives, veterinary experts and services, and the like may be used in conjunction with observed (e.g., behavioral or physiological patterns) or user-provided information (e.g., age, breed, temperament) about the pet to provide guidance/advice/suggestions to the human user with regard to managing their pet. This augmented advice can be customized to the human user and/or to their pet and can either be provided to the human user in the form of suggestions for modifying the management of their pet, or may be used to automatically modify management of the pet (e.g., override food/fluid portions, feeding intervals and the like that were defined for the pet by the pack members or caretakers) by the smart bowl system. Examples of advisor information can include: a pet's exercise or activity needed based on the pet's eating schedule, nutrition and activity recommendations based upon the pet's age, breed and region, games to play with a pet for bonding with the caretaker. In some embodiments, the advisor may also be able to search local social networks so that pet events can be found and stored in the server memory and/or caretaker computing device memory. The advisor can then be searched and displayed on the user interface of the caretaker's computing device. For example, in an embodiment the smart bowl advisor may communicate with social network meet up groups and allow caretakers to search, select and RSVP to meet up events.

As discussed, the smart bowl system can perform data gathering based upon the monitoring of the food and/or water smart bowls. Observations or measurements from the bowl could be transmitted to the cloud (remote server) and/or monitored remotely by a user caretaker computing device (e.g., a mobile phone or tablet or other computing device). Table 5 illustrates food and water information that can be detected and monitored by the food and water smart bowls

TABLE 5

| Food | Water |
| --- | --- |
| How much fed | Amount of water |
| Whether amount was left in bowl | Water in bowl yes/no and how much |
| When dog last ate | When dog last drank |
| How fast pet ate | How often and how much pet drinks |
| Is bowl is overfilled with pet food compared to recommended levels (the say when level)- people often overfeed their pets because they feel guilty cutting back. This behavior would be evident here. | How often the water is changed |
| How often bowl is removed/corresponding to getting washed | How often bowl is removed/corresponding to getting washed |
| Duration of feeding (Time between when put bowl down to when food is finished) | Corresponding drinks relative to 'freshness' of water and do pets prefer fresh water for example encouraging pet care |

In some embodiments, the smart bowls can include bowl sensors, which can be used to detect the contents and/or characteristics of the contents of the bowls. Table 6 illustrates some of the possible food and water sensor detection capabilities.

TABLE 6

| Dog is eating | Dog is drinking |
| --- | --- |
| Kind of food (wet, dry, freeze dried etc.) | Freshness of water (how dirty, presence of bacteria or when last filled) |
| Ingredients (Chicken vs. beef vs. vegetable. | |

TABLE 6-continued

| Dog is eating | Dog is drinking |
|---|---|
| Food safety and purity: check for spoiled, rotten, allergy triggering ingredient, bacteria, poison) | Water safety and purity: check for unhealthy microbes, poison, chemicals |

The smart bowls can be display optical light outputs that can indicate the status of the communications systems of the smart bowl base as listed in Table 7. All parameters that may be communicated by the smart bowl to the cloud server and then to caretaker(s) computing device(s).

TABLE 7

| State: action needed/reminders | Blink green at feeding time based on feeding schedule how many times a day<br>Blink yellow to indicate low battery, battery needs to be changed or charged.<br>Blink blue to indicate connecting to WiFi<br>Solid blue after blinking blue to indicate connected to WiFi<br>Flashing red: urgent attention is needed to the dog, smart bowl, smart bowl app or food |
|---|---|
| Base button press | Green light: Feed pet. Pet HAS NOT been fed within set parameters of scheduled feeding time avoiding double feeding.<br>Red light: Do not feed- dog HAS been fed within set parameters of scheduled feeding time |

In an embodiment, the user may press and hold the base button to reset tares the weight sensor of the smart bowl base. After resetting the tare the detected weight on the smart bowl base scale, will be calibrated as zero. In some embodiments, different bowls can be used with the smart bowl base. The base may be calibrated to a first bowl and the recalibration process can be repeated when a different sized scale is placed on the base to recalibrate the weight reading to zero so that only the food or water placed in the bowls are weighed. In an embodiment, the caretaker can press and hold the base button and the base can respond by the light output being solid white and the blinking white twice to let the caretaker know when the tare has been set.

Various parameters may be controlled remotely for the smart bowl system as listed in Table 8 through the user interface of a caretaker's computing device which can be a smart phone.

TABLE 8

| Food | Water |
|---|---|
| Right amount of food- weight/volume- the 'say when' amount to optimize meal size | Recommended amount of water |
| Schedule for action/communication (see above) meal time reminders | Schedule for action/communication (see above) |
| Emergency alert- from a push Notification | Emergency alert- from a push notification |
| Fed/not fed schedule | Change water/do not change water |
| Color LED to blink, breathe and Behavior | Color LED to blink, breathe and behavior |
| Remote tare- tare without pressing the button | Remote tare- tare without pressing the button |
| Dog food ingredients/type of food | Water bowl or not water bowl |

The mobile computing devices of the caretakers can be configured with differential access settings and privileges for: Information shared, Alert types, Notification types based on a caretaker hierarchy as listed in Table 9.

TABLE 9

| Primary caretaker | Setting: set as primary caretaker Set to Home or Away<br>Set to any status to trigger communication rules i.e. vacation as opposed to home or away<br>Set geofence rules<br>Set up pack- direct order of worry-free care ladder for phone calls and reminders to feed the dog/care for the dog<br>Communication preferences: text/message/call/email<br>Create multiple packs depending on situation or geofence rules |
|---|---|
| Supporting caretaker | Within app: Communication rules and preferences Reminders |
| Information Shared: Caretaker | Away mode provides more information to owner Primary and is more proactive about messaging and logging to give the owner peace of mind. Shared information can include: Reassurance pet has been fed or if pet has not been fed smart bowl system can transmit feeding reminders to secondary caretaker(s), Log of reminders sent to other caretakers so no action necessary, Emergency alerts: dog food recall, change in eating or drinking habits; Automatic detailed messages to 'alpha' caretaker(s) based on preferences. |
| Information Shared: Supporting Caretaker caretaker | Feeding instructions, schedule reminders for the caretaker such as how much pet food to feed the pet and when to feed the pet.<br>Feeding schedule reminders: within hourly range of pre-set schedule<br>Feeding instructions: amount to feed, stop filling the bowl signal when proper amount of food placed in bowl.<br>Emergency alerts: dog food recall, change in eating or drinking habits<br>Auto-message 'alpha' caretaker when task complete, logged-caretaker doesn't need to |
| Alert types | In app messaging, vibration, email, text (app not needed), phone call |
| Notification types | Dog has been fed, dog is eating, dog is drinking, changes in behavior |

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A smart bowl system comprising:
a food container;
a food container base for supporting the food container, the food container having: a food container weight sensor, a food container visual output, a food container radio frequency transmitter, a food container processor coupled to the food container weight sensor, the food container visual output, and the food container radio frequency transmitter; and
pet feeding software running on a mobile computing device having: a visual display, a mobile radio frequency transceiver and a mobile computing processor coupled to the visual display and mobile radio frequency transceiver;
wherein the food container base include a button coupled to the food container base processor which is coupled to a memory for storing a feeding schedule and wherein the button is pressed to interrogate the food container base processor which causes the food container visual display to indicate if pet food has been placed in the food container in compliance with the feeding schedule or if pet food has not been placed in the food container in compliance with the feeding schedule.

2. The smart bowl system of claim 1 further comprising:
a server having a processor coupled to a database for storing pet information;
wherein server communications with the food container processor through a network and the food container processor transmits food weight information detected by the food container weight sensor to the server and the food weight information is stored in the database.

3. The smart bowl system of claim 1 wherein the food container base processor is coupled to a memory for storing a predetermined weight corresponding to a predetermined amount of pet food and when pet food is placed in the food container, the food container weight sensor detects the weight of the pet food and the food container processor actuates the food container visual output when the predetermined amount of pet food is placed in the food container.

4. The smart bowl system of claim 3 wherein the food container base processor transmits a pet fed signal through the food container radio frequency transmitter to the mobile radio frequency transceiver and the mobile computing processor displays pet feeding information on the visual display.

5. The smart bowl system of claim 1 wherein pet food is placed in the food container, the food container weight sensor detects an initial weight of the pet food and changes in the weight of the pet food, the food container processor transmits the initial weight of the pet food and the changes in the weight of the pet food to the mobile computing device.

6. The smart bowl system of claim 5 wherein mobile computing device displays the initial weight of the pet food and the changes in the weight of the pet food.

7. The smart bowl system of claim 1 wherein the feeding schedule including a daily quantity of the pet food placed in the food container is determined by a weight and an age of a pet.

8. The smart bowl system of claim 1 wherein the food container visual display is a multi colored light within the food container base.

9. A smart bowl system comprising:
a food container;
a food container base for supporting the food container, the food container base having: a food container weight sensor, a food container visual output, a food container base radio frequency transmitter, a food container base processor coupled to the food container weight sensor, the food container visual output, and the food container base radio frequency transmitter;
a water container; and
a water container base for supporting the water container, the water container base having: a water container weight sensor, a water container visual output, a water container base radio frequency transmitter, a water container base processor coupled to the water container weight sensor, the water container visual output and the water container radio frequency transmitter;
pet feeding software running on a mobile computing device having: a visual display, a mobile radio frequency transceiver and a processor coupled to the visual display and mobile radio frequency transceiver;
wherein the water container base include a button coupled to the water container base processor which is coupled to a memory for storing a feeding schedule and wherein the button is pressed to interrogate the water container base processor which causes the water container visual display to indicate if water has been placed in the water container in compliance with the feeding schedule or if water has not been placed in the water container in compliance with the feeding schedule.

10. The smart bowl system of claim 9 further comprising:
a server having a processor coupled to a database for storing pet information;
wherein server communications with the food container processor and the water container processor through a network and the food container processor transmits food weight information detected by the food container weight sensor and the water container processor transmits water weight information detected by the water container weight sensor to the server and the food weight information and the water weight information are stored in the database.

11. The smart bowl system of claim 9 wherein the water container base processor actuates the water container visual output when the water container is empty.

12. The smart bowl system of claim 9 wherein the water container base processor transmits a water bowl empty signal when the water container is empty through the water container radio frequency transmitter to the mobile radio frequency transceiver and the mobile computing processor displays water bowl empty information on the visual display.

13. The smart bowl system of claim 9 wherein water is placed in the water container, the water container weight sensor detects an initial weight of the water and changes in the weight of the water, the water container processor transmits the initial weight of the water in the water container and the changes in the weight of the water to the mobile computing device.

14. The smart bowl system of claim 13 wherein mobile computing device displays the changes in the weight of the water.

15. The smart bowl system of claim 14 wherein pet food is placed in the food container, the food container weight sensor detects an initial weight of the pet food and changes in the weight of the pet food, the food container processor transmits the initial weight of the pet food and the changes in the weight of the pet food to the mobile computing device.

16. The smart bowl system of claim 15 wherein mobile computing device displays the changes in the weight of the pet food together with the changes in the weight of the water.

17. The smart bowl system of claim 9 wherein the water container base include a button coupled to the water container base processor which is coupled to a memory for storing a feeding schedule and wherein the button is pressed to interrogate the water container base processor which causes the water container visual display to indicate if water has been placed in the water in compliance with the feeding schedule or if water has not been placed in the water container in compliance with the feeding schedule.

18. The smart bowl system of claim 9 wherein the feeding schedule including a daily quantity of the pet food placed in the food container is determined by a weight and an age of a pet.

19. The smart bowl system of claim 9 wherein the water container visual display is a multi colored light within the water container base.

\* \* \* \* \*